(12) United States Patent (10) Patent No.: US 10,140,512 B2
Lahmann et al. (45) Date of Patent: Nov. 27, 2018

(54) CHART ANALYSIS METHOD AND SYSTEM

(71) Applicant: think-cell Software GmbH, Berlin (DE)

(72) Inventors: Dominik Lahmann, Berlin (DE); Philipp Nordhus, Berlin (DE); Arno Schodl, Berlin (DE)

(73) Assignee: Think-Cell Software GMBH, Berlin (DE)

( * ) Notice: Subject to any disclaimer, the term of this patent is extended or adjusted under 35 U.S.C. 154(b) by 0 days.

(21) Appl. No.: 15/415,447

(22) Filed: Jan. 25, 2017

(65) Prior Publication Data

US 2018/0211108 A1 Jul. 26, 2018

(51) Int. Cl.
*G09B 29/00* (2006.01)
*G06K 9/00* (2006.01)
*G06T 11/60* (2006.01)
*G06K 9/62* (2006.01)
*G06T 7/10* (2017.01)

(52) U.S. Cl.
CPC ..... *G06K 9/00469* (2013.01); *G06K 9/00476* (2013.01); *G06K 9/6202* (2013.01); *G06K 9/6215* (2013.01); *G06K 9/6277* (2013.01); *G06T 7/10* (2017.01); *G06T 11/60* (2013.01)

(58) Field of Classification Search
CPC .................................. A61F 2/00; G06K 9/00
USPC ............ 382/113; 348/182, 66; 715/215, 779
See application file for complete search history.

(56) References Cited

U.S. PATENT DOCUMENTS 7,610,549 B2 * 10/2009 Vignet ................... G06Q 10/06
 707/999.102
9,053,579 B2 * 6/2015 Saund ................... G06T 11/206

* cited by examiner

*Primary Examiner* — Abolfazl Tabatabai
(74) *Attorney, Agent, or Firm* — Harness, Dickey & Pierce, P.L.C.

(57) ABSTRACT

The invention relates to an image analysis method for automatically extracting data from a bar chart. A processor receives a digital image of a bar chart comprising a plurality of o-bars. The processor provides a plurality of hypothesis charts respectively specifying a sequence of h-bars, a particular way of grouping the h-bars into categories, and an injective mapping from the o-bars to the h-bars. The processor compares the h-bars of the hypothesis charts with the o-bars of the bar chart in the image for assigning the o-bars to series and categories in accordance with the one of the hypothesis charts whose h-bars are most similar to the o-bars and for returning the series and the category assigned to said o-bars.

21 Claims, 6 Drawing Sheets

CHART ANALYSIS METHOD AND SYSTEM

FIELD OF THE INVENTION

The invention relates to the field of data processing, and more particularly to the automated analysis of digital bar chart images.

BACKGROUND AND RELATED ART

To simplify the understanding, data is typically represented graphically in all kinds of electronic as well as paper-based media. For example, charts are commonly used for presenting data on web pages, online- and print magazines. Charts depicted in print media can be digitized by capturing the chart with a camera or a scanning device for providing a digital representation of the chart. A large variety of different chart types exists, e.g. bar charts, pie charts, doughnut charts or the like. Charts of a particular type, e.g. a bar chart, may vary greatly e.g. in respect to the colors or textures, the size, type, position and orientation of bars and bar segments.

In case the data that is graphically represented in a digital bar chart image shall be used as a basis for further data processing, the complexity and diversity of digital bar charts has hitherto often resulted in poor data quality, the extraction of erroneous data or has precluded an automated extraction of data completely. Thus, in many cases a user had to type in the data represented by a bar chart in a target application by hand.

Even in case the data extraction from a digital bar chart image was performed automatically, the image analysis was computationally highly demanding. Accuracy and/or performance problems were observed in particular for chart segmentation tasks and for tasks related to the assignment of identified bars in bar chart images to categories and series.

Conventional bar chart image segmentation algorithms with high segmentation accuracy exist, but they were observed to consume lots of CPU power and thus often could not be used for performing chart segmentation for a real time data extraction task. Computationally less demanding bar chart image segmentation algorithms also exist, but they were often observed to be unsuited for extracting data from a chart due to insufficient segmentation accuracy. Due to the variability of chart types and their segments, a highly accurate detection of chart segments and segment borders is crucial for any further image analysis steps, e.g. for assigning bars or bar segments to particular series or categories.

Even in case a state of the art bar chart image segmentation algorithm was able to correctly identify all bar segments in a chart, the automated assignment of identified bars to respective categories and data series was often performed erroneously due to the high variability of existing bar chart types, in particular due to many possible coloring schemes and exceptions in bar coloring, e.g. for emphasizing single bars. Further sources of error are the use of similar colors and textures for bars of different data series and bars which represent a value corresponding to a height of zero pixels with the effect of not being visible in the chart image.

SUMMARY

Embodiments of the invention provide an improved method, computer program product and system for analyzing a bar chart. Corresponding methods, computer program products and computer systems are specified in the independent and dependent claims. Embodiments of the present invention can freely be combined with each other if they are not mutually exclusive.

In one aspect, the invention relates to a method for a computer-implemented image analysis method for automatically extracting data from a bar chart. The method comprises:

a. receiving a digital image of a chart, the image comprising a plurality of o-bars, each o-bar being a set of pixels of the digital image, each set of said sets of pixels representing a bar of the bar chart; for example, the digital image with the o-bars can be displayed on a screen; in this case, the o-bars may be the bars visible to a user looking at the screen;

a. providing a plurality of hypothesis charts, each hypothesis chart being a data object that specifies a sequence of h-bars, that specifies a particular way of grouping the h-bars into categories, and that comprises an injective mapping from the o-bars to the h-bars such that each o-bar has assigned one of the h-bars of said hypothesis chart;

b. comparing the position, color and/or texture of the h-bars of each of the plurality of hypothesis charts with the position, color and/or texture of their respectively mapped o-bars for identifying the one of the plurality of hypothesis charts that is most similar to the o-bars of the bar chart; and c. applying the grouping of the h-bars as specified in the identified most similar hypothesis chart on the o-bars such that each o-bar gets assigned the series and category of the h-bar of the identified most similar hypothesis chart that is mapped to said o-bar; and d. returning the series and the category assigned to each of the o-bars by the identified most similar hypothesis chart In a still further aspect, the invention relates to a computer-implemented method of segmenting an image along a horizontal direction. The method comprises: searching a horizontal search space (which may represent a horizontally oriented sub-image of the chart image or the whole chart image) ranging from pixel position x=0 to x=width of the image, thereby using a first dynamic programming algorithm for identifying the most probable horizontal segmentation of the horizontal search space (i.e., for identifying the most probable vertically oriented segment borders within the horizontally oriented sub-image), the most probable horizontal segmentation being indicative of the most probable left and right segment borders of any segment identified in the horizontal search space, said first dynamic programming algorithm computing a probability that a currently examined segment candidate between a left candidate segment border cut $c_{left}$ and a right candidate segment border $e_{right}$ represents a true segment of the image, thereby using previously computed probabilities for one or more sub-segments contained within said segment candidate for reducing computations while searching the horizontal search space. The probabilities for at least some of the one or more sub-segments have already been computed previously when examining segment candidates between previously defined left and right segment borders $C_{left\_prev}$, $e_{right\_prev}$. If the probabilities for the sub-segments are too low, the computation of the currently examined segment is skipped.

In a still further aspect, the invention relates to a computer-implemented method of segmenting an image along a vertical direction. The method comprises: searching a vertical search space (which may represent a vertically oriented sub-image of the chart image or may represent the whole chart image) ranging from pixel position y=0 to y=height of the image, thereby using a second dynamic programming algorithm for identifying the most probable vertical segmentation of the vertical search space (i.e., the most probable horizontally oriented segment borders within the vertically oriented sub-image), the most probable vertical segmentation being indicative of the most probable bottom and top segment borders of any segment identified in the vertical search space, said second dynamic programming algorithm computing a probability that a currently examined segment candidate between a bottom candidate segment border cut $c_{bottom}$ and a top candidate segment border $e_{top}$ represents a true segment of the image, thereby using previously computed probabilities for one or more sub-segments contained within said segment candidate for reducing computations while searching the vertical search space. The probabilities for at least some of the one or more sub-segments having already been computed previously when examining segment candidates between previously defined bottom and top segment borders $c_{bottom\_prev}$, $e_{top\_prev}$. If the probabilities for the sub-segments (representing the upper-bound probability of the currently examined segment candidate) are too low, the computation of the currently examined segment is skipped.

The horizontal and/or vertical image segmentation can be combined with each other. Moreover, the horizontal and/or vertical image segmentation can be combined with features of embodiments described herein with regard to the alignment of o-bars and h-bars and/or can be combined with features of embodiments relating to the horizontal or vertical image segmentation described herein in the context of the alignment of o-bars and h-bars.

In a further aspect, the invention relates to a computer system comprising one or more processors. The processors are configured for performing an image analysis method for automatically extracting data from a bar chart and/or for performing a segmentation along a horizontal and/or vertical direction as described above and/or as described herein for embodiments of this invention.

In a further aspect, the invention relates to a tangible, non-volatile storage medium comprising computer-interpretable instructions which, when executed by one or more processors, cause the processors to perform an image analysis method for automatically extracting data from a bar chart and/or to perform a segmentation along a horizontal or vertical direction as described above and/or as described herein for embodiments of this invention.

BRIEF DESCRIPTION OF THE DRAWINGS

In the following embodiments of the invention are explained in greater detail, by way of example only, making reference to the drawings in which:

FIG. 5A-D depict a "sliding window" approach for finding a hypothesis chart according to which bars are grouped such that the grouping of the h-bars in the hypothesis chart and the grouped "observed" bars in the chart are most similar;

DETAILED DESCRIPTION

Figure 1:
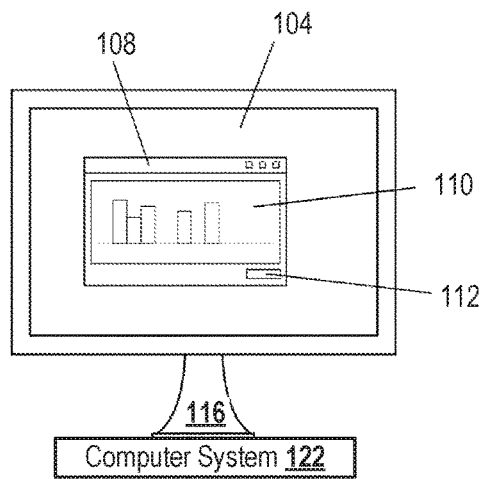
FIG. 1 depicts a screen displaying a vertical bar chart.

Embodiments of the invention may have multiple benefits.

The use of hypothesis charts for assigning series and categories to bars observed in a digital image of a bar chart may be particularly robust against many potential sources of errors. Those error sources comprise, among others, single bars drawn in different color than expected for highlighting, the use of very similar colors for bars of different data series, in particular if the bars of different series have adjacent positions, and the absence of bars which represent zero values. A chart analysis algorithm may erroneously consider the absence of a bar (representing a zero data value or some other data value corresponding to a height of zero) as an inter-bar space or as the end of a category comprising multiple bars. Moreover, if the chart is derived from a scan of a printout, the quality of the digital image may be low e.g. because of low scanning resolution, lost color information, a modification of the color of some bars due to shadows or light spots on the printout.

Moreover, the use of hypothesis charts for assigning series and categories to o-bars may provide for a computationally fast and robust image analysis method allowing to identify the data series and category a bar in a bar chart belongs to. For example, some computationally fast bar chart analysis methods simply used the color information of the bars for grouping bars of similar color into the same data series. Said approaches have been observed to be highly error prone, in particular when analyzing scanned chart images which may have an inhomogeneous intensity distribution due to shadows on the scanned image, scanning artifacts, etc. Thus, embodiments of the invention may be particularly suited for accurately identifying the correct category and data series each bar in a chart belongs to and/or may be particularly suited for being executed in use case scenarios in which the CPU consumption needs to be minimized. For example, the image analysis method may be implemented and performed on a remote server e.g. as a cloud service which needs to be able to analyze a large number of chart images concurrently. According to another example, the image analysis method is performed on a battery-powered, handheld telecommunication device comprising only limited CPU power.

According to embodiments, the returning of the series and the category assigned to each of said o-bars by the identified most similar hypothesis chart comprises:

a. extracting numerical data represented by the o-bars of the chart;

b. representing the extracted numerical data in the form of a tabular data structure, each of the columns of said tabular data structure representing one of the series and comprising numerical data represented by o-bars assigned to said series, each of the rows of said tabular data structure representing one of the categories and comprising numerical data represented by o-bars assigned to said category, or vice versa; and c. returning the tabular data structure.

According to embodiments, the chart is a bar-chart. The numerical data comprises, for each of the o-bars, a data value represented by the height of said o-bar. The method comprises, for each of the o-bars:

a. identifying a label positioned in spatial proximity to said o-bar;
b. extracting a numerical value specified in said label by applying an OCR algorithm;
c. using the assignment of the identified o-bars to a series and to a category for assigning, to the extracted numerical value, the series and the category to which its corresponding o-bar was assigned to; and
d. filling one of the cells of the tabular data structure with the extracted numerical value, whereby the numerical value having assigned a particular series and a particular category fills the one of the cells in the tabular data structure whose corresponding row and column represent said particular series and category For example, the extraction of the numerical data may comprise identifying label strings in spatial proximity of the bar, applying an OCR algorithm for identifying the symbols contained in the label and parsing the sequence of symbols for identifying digits, decimal separators, thousands separators and other symbols and for interpreting the sequence of symbols to identify the numerical value represented by the label. After having extracted a numerical value for each of the o-bars, all numerical values belonging to a particular data series, e.g. "male students" are stored in the cells of a particular column of the tabular data structure. Numerical values belonging to bars of a different data series, e.g. "female students" are stored in the cells of a different column. Moreover, all numerical data values extracted from bars belonging to a particular category, e.g. "1978" are stored in cells of a respective row while all numerical data values extracted from bars belonging to a different category like "1988" are stored in the cells of a different row. Depending on the embodiments, the rows may represent categories and the columns may represent data series or vice versa, i.e., the rows may represent data series and the columns of the data structure may represent categories.

Returning the extracted data in the form of a tabular data structure whose rows and columns represent data series and categories may be advantageous as this data format can easily be interpreted by many spreadsheet application programs and charting programs and thus can be used for automatically creating a new chart from the numerical values automatically extracted from the chart in the digital image.

According to embodiments, each hypothesis chart comprises an assignment of an expected, series-specific color and/or texture to each of its h-bars in dependence on the position of the h-bars in a category. The identification of the most similar hypothesis chart comprises, for each of the hypothesis charts:

a. determining an insertion defect for each h-bar of the hypothesis chart that cannot be aligned (according to the injective mapping from o-bars to h-bars specified in each hypothesis chart) to one of the o-bars of the chart; and/or b. determining a substitution defect for each h-bar of the hypothesis chart that has a different color or texture than the one of the plurality of o-bars to which it is aligned;

c. accumulating (e.g. counting or applying another aggregation function) the totality of insertion defects and/or substitution defects for computing a similarity score, whereby the higher the number of insertion defects and/or substitution defects, the lower the degree of similarity between the hypothesis chart and the o-bars in the chart.

An "insertion defect" as used herein is an observed deviation of he existence of a bar grouped according to a hypothesis chart ("h-chart") from the observed sequence of o-bars. The deviation occurs in case according to the grouping of h-bars by the h-chart and according to the mapping of h-bars to o-bars the existence of an h-bar is predicted at a position where in the "observed" chart no bar exists. Thus, an insertion defect is counted for each h-bar in the h-chart where there is no "observed" bar visible in the input chart, e.g. because the height of said bar may be "0".

A "substitution defect" as used herein is an observed deviation of the color and/or texture of an h-bar from the color and/or texture of the o-bar to which it may be assigned. For example, according to some embodiments the h-charts are created such that each h-bar is assigned the most probable, i.e. most frequent, color and/or texture of candidate bars ("c-bars") given the color and/or texture of the o-bars at a particular category position as input. Thus, the colors of the h-bars may already comprise some information on a possible color distribution of a chart. For example, the "observed" color of an o-bar may have been identified before or during an image segmentation step. The color of the h-bars of a particular series of an h-chart may be set to the color of the majority of o-bars whose corresponding h-bars are assigned to said series.

A substitution defect can be remedied by substituting the color or texture of a bar with another (expected/most probable) color or texture. According to some embodiments, each bar constitutes a single segment and corresponds to a single color and/or texture. In other embodiments, each bar may comprise multiple segments having different colors and/or textures.

Thus, a substitution defect is counted for each h-bar in the h-chart whose color and/or texture deviates from the color or texture of the corresponding o-bar in the chart of the digital image (herein also referred to as the "observed" or "observable" chart and its o-bars can be "observed" by a user in case the chart is displayed on a screen). For example, in case two h-bars are expected to have—according to the grouping of the h-bars into categories specified by the h-chart and according to the respective category positions of the two h-bars—identical colors but are mapped to two o-bars having different colors, the occurrence of a substitution defect is automatically determined; likewise, in case two h-bars are expected to have different colors but are mapped to two o-bars having the same color, the occurrence of a substitution defect is determined.

When the sequence of "observed" bars in the chart is compared with the h-bars grouped in accordance with a currently examined h-chart, all insertion and substitution defects between the h-bars in the h-chart and the sequence of identified "observed" bars in the chart are determined. For each identified insertion or deletion defect, a penalty is counted. A penalty is a numerical value and represents a kind of score value.

Comparing the h-bars of a currently examined h-chart with the observed bars of the observed chart comprises identifying all substitution and insertion defects, computing an aggregated penalty value for all identified substitution and insertion defects (e.g. the sum of all defects) and using the aggregated penalty value as a dissimilarity score for determining the similarity (and correspondingly: dissimilarity) of the h-bars of the h-chart and the observed bars. The higher the aggregated penalty score for a particular h-chart and the observed sequence, the higher the dissimilarity and the lower the similarity between the sequence of h-bars and the sequence of "observed" bars observed in the chart, According to some embodiments, the method comprises maintaining a plurality of predefined h-charts. Each h-chart has a predefined number of h-bars per category and thus determines how a sequence of h-bars is to be grouped into one or more categories in accordance with the h-chart. Moreover, each h-chart may comprise a specification of the color and/or texture of each bar at a particular position within a category or of the color and/or texture of a bar segment at a given bar position within a category and segment position within said bar. In addition, it comprises an injective mapping from o-bars to h-bars such that each o-bar is guaranteed to have assigned exactly one of the h-bars. There may exist a plurality of different h-charts for a particular number of h-bars per category, each of said plurality of h-charts differing from each other in respect to the color and/or texture of the h-bars or h-bar segments of the h-chart and/or in respect to the grouping of h-bars and/or their mapping to o-bars.

According to some embodiments, the method further comprises generating and providing the plurality of hypothesis charts. The provision of the hypothesis charts comprises:

a. identifying a width of the identified o-bars;
b. generating a sequence of c-bars by representing each o-bar identified in the chart as a c-bar and by inserting as many c-bars having the identified width in the spaces between adjacent c-bars of said sequence of c-bars as possible;
c. tentatively grouping the c-bars into series and categories for identifying the totality of groupings which respectively group at least all c-bars representing an o-bar into one or more categories of h-bars without violating one or more predefined constraints, whereby each grouping that does not violate a constraint is used as a respective hypothesis chart that groups h-bars into categories and series; and
d. providing the identified totality of hypothesis charts not violating a constraint.

Typically, the width of all o-bars in a chart will be identical. As the algorithm implies, the sequence of c-bars will comprise at least as many c-bars as there exist o-bars in the chart of the image. The algorithm may then identify all possible groupings of c-bars that meet one or more constraints ("valid groupings") and store each set of valid groupings that assigns at least to all c-bars which correspond to an o-bar a series and a category. Said set of groupings and assignments are then stored as a "hypothesis chart". The c-bars stored as part of a hypothesis chart are in the following referred to as "h-bars".

For example, the constraints may be constraints for the logical consistency of a bar chart. The constrains may specify, for example, that all categories of a chart must comprise the same number N, representing the number of series, of c-bars and that each c-bar representing an o-bar must be grouped into exactly one category. For example, the number N may be any positive integer, e.g. 1 (for generating hypothesis charts having 1 h-bar per category), 2 (for generating hypothesis charts having 2 h-bars per category), 3 (for generating hypothesis charts having 3 h-bars per category), and so on. The identification of the totality of hypothesis chart may comprise generating groupings of c-bars into one or more categories having N c-bars per category, whereby N is varied.

The sequence of c-bars thus represents an extended sequence of o-bars which comprises some c-bars that correspond to and are mapped to o-bars and some c-bars that actually fill gaps between o-bars and thus are not mapped to an o-bar. For example, free space between two o-bars of a chart may be caused by a data value "0" represented in the chart by a bar having the height "0" so there may not exist an "observed bar" at the expected position. Alternatively, the space between two o-bars could be an inter-category space or space at the left or right border of the chart.

According to embodiments, the creation of the extended sequence of c-bars comprises adding additional c-bars before (to the left of) the leftmost o-bar that was identified in the chart and adding additional c-bars after (to the right of) the rightmost o-bar that was identified in the chart. For different h-charts, different numbers of c-bars (that may later become the h-bars of the h-chart) may be added before and after the left- and rightmost observed bars. For example, in case an h-chart specifies that there always exist N h-bars per category, N−1 c-bars are added before the leftmost observed bar and N−1 c-bars are added after the rightmost observed bar for generating the extended sequence of c-bars. Adding additional c-bars at both ends of the observed set of bars may be advantageous as this may ensure that the option that a zero-value o-bar exists at the begin or end of a bar chart may also be evaluated and taken into account.

If a hypothesis chart is generated when at least all c-bars that correspond to an o-bar have been grouped to a category without violating a constraint, the grouped c-bars of the created hypothesis chart become the h-bars of said hypothesis chart ("h-chart") and the mapping from o-bars to c-bars evaluated during hypothesis chart generating is used as the injective mapping from o-bars to the corresponding h-bars.

Generating the hypothesis charts based on an analysis of the o-bars of the chart may be advantageous as the set of hypothesis charts evaluated can be reduced to the set that has at least a minimum degree of similarity. Thus, the number of hypothesis charts which have to be processed for computing a defect score/a similarity score may be reduced and CPU resources may be saved. For example, the constraints may be specified such that a hypothesis chart that is based on a very high number N such as 50 will immediately violate a constraint already when grouping the first 50 c-bars to a category. In this case, the generation of hypothesis charts having a number N=50 may be aborted completely.

Generating the extended series of bars may be advantageous as the generated c-bar sequence is suited for an automated alignment procedure that allows quickly and accurately determining if a particular space between two o-bars represents the space between two different categories or represents the position of an o-bar that has a height that is zero or close to zero. Thus, the extended sequence of c-bars represents a data structure that allows for an efficient checking whether a currently examined grouping of c-bars violates a constraint and whereby also the hypothesis that the observed chart comprises an invisible, zero-valued first bar or last bar is checked.

According to some embodiments, the identification of all hypothesis charts which group the c-bars into one or more categories respectively comprising N h-bars without violating one or more predefined constraints comprises:

grouping an initial set of N c-bars of the sequence of c-bars into a first candidate for the first category of the chart without violating a constraint and starting creating a first hypothesis chart having stored the grouping of c-bars of the first category;

grouping a subsequent set of N c-bars of the sequence of c-bars into a first candidate for a subsequent category of the chart, the subsequent set of bars consisting of the N c-bars immediately following the position of the last bar of the category into which said N c-bars were grouped in the previous grouping step;

checking if a predefined constraint is violated upon grouping the subsequent set of N c-bars and if a termination condition is fulfilled;

if no constraint is violated, storing the grouping generated in step b) as a subsequent category to the hypothesis chart whose creation started in a) and repeating step b) on a set of N c-bars to be grouped that is shifted by N c-bars;

if no constraint is violated and all c-bars representing an o-bar have been grouped into a category, returning the hypothesis chart whose creation started in a);

if one or more constraints are violated, repeating step b) on a set of N c-bars to be grouped that is shifted by one without storing the grouping generated in step b) as a subsequent category to the hypothesis chart whose creation started in a).

The above steps may ensure that only c-bar groupings which meet all constraints become h-bar groupings of respective h-charts.

The above steps may be repeated multiple times, thereby using a different initial set of c-bars and/or using a different scheme of selecting and grouping the next set of c-bars until all possible (valid, constraint-compliant) groupings of the c-bars into one or more categories of exactly N c-bars have been identified. This may be advantageous as said steps provide for a "sliding window" approach according to which different groupings of c-bars for a given number N are tested. For a given number N, a plurality of different hypothesis charts may be generated that all group N c-bars into one or more categories without violating a constraint. According to embodiments, said operation is repeated for multiple different Ns, e.g. for a predefined number N or for a number N=1, N=2, N="number of o-bars observed in the chart". In case a violation of a constraint is observed, the group of c-bars that has generated the violation is not stored as a further category in the hypothesis chart that is currently generated. Rather, the "window" used for grouping the c-bars is shifted (e.g. one c-bar forward to the right) in order to check if the "shifted grouping" violates a constraint. Thus, a hypothesis chart is generated by consecutively evaluating if a grouping of c-bars violates a constraint, storing the grouping as a category and shifting the window by N bars if it does not violate a constraint and shifting the window by one c-bar if it violates a constraint.

The approach can be implemented as a "backtracking algorithm". A backtracking algorithm enumerates a set of partial candidates that, in principle, could be completed in various ways to give all the possible solutions to the given problem. The completion is done incrementally, by a sequence of candidate extension steps. Here, the given problem is to identify all possible groupings of c-bars into groups of N c-bars that do not violate a constraint. Each grouping of a subsequent set of N h-bars corresponds to a candidate extension step and any constraint violation is used for identifying a candidate extension step that cannot possibly represent a valid solution to the problem of creating an h-chart whose categories, i.e., groups of h-bars that are mapped to o-bars such that no constraint is violated.

Said features may be advantageous as a fast method is provided for generating a large number of "hypotheses" in the form of "hypothesis charts" on how bars of a chart can validly be assigned to series and categories and which may be used as a basis for implementing a robust and efficient algorithm for identifying the most likely, i.e., the most similar, hypothesis for said assignments.

According to embodiments, the generation of the hypothesis charts comprises identifying all possible (valid, constraint-compliant) groupings of the c-bars into one or more categories for many different Ns. For example, the hypothesis chart generation could start at N=1 and identify all valid hypothesis charts having exactly one h-bar per category. Next, the hypothesis chart generation could continue at N=2 and identify all valid hypothesis charts having exactly two h-bars per category. Next, the hypothesis chart generation could continue at N=3 and identify all valid hypothesis charts having exactly three h-bars per category. Said steps may be repeated until a predefined maximum number of N may be evaluated or until another predefined termination criterion is reached.

According to embodiments, the generation of the hypothesis charts is performed on multiple CPUs in parallel, whereby different CPUs generate h-charts having different numbers N of h-bars per category. For example, a first CPU could generate h-charts for N=1, a second CPU could generate h-charts for N=2, a third CPU could generate h-charts for N=3 and so on.

After all c-bars which correspond to an o-bar have successfully been grouped into categories and series without violating a constraint, a corresponding h-chart is created. As the grouping of the c-bars has to meet all constrains in order to allow the creation of a corresponding h-chart, all h-bars in a hypothesis chart and their grouping into categories and series necessarily complies with the constraints.

According to embodiments, the one or more predefined constraints are selected from a group comprising:

in case a chart depicts multiple series, each h-bar of a category must belong to a different series;

in case a chart depicts multiple series, the order of the series the h-bars of a category belong to is identical for all categories of the chart;

at least one h-bar in each category in the chart can be mapped to an o-bar;

there must be fewer h-bars per category than the total number of o-bars;

within the sequence of h-bars, the space between adjacent h-bars of different categories is never smaller than the space between adjacent h-bars within the same category.

Said constraints may be advantageous as they allow identification of partial h-bar alignment results which cannot be part of a valid grouping of bars into categories and series and allow skipping the comparison of grouped h-bars with observed bars which can never represent a valid assignment of bars to categories.

According to some embodiments, each h-chart specifies, for each h-bar at a given position within a category, a position-specific (i.e., data series-specific) color and/or texture. According to some embodiments, each h-chart specifies, for each h-bar and at a particular bar-position in a category a group of series- and bar-segment specific colors and/or textures of all bar-segments within said bar. The color and/or texture assigned to a particular series/category position represents the most probable color or texture of a particular bar (or colors and textures of bar segments of a particular bar) at the respective bar position in a category within the chart.

For example, the probability of the colors and textures can be automatically determined by determining all colors of all o-bars (or o-bar's segments) identified in the chart and determining the respective frequencies at the respective bar position in a category. The most frequently observed color or texture is used as the most probable color or texture at the respective bar position in a category.

The probabilities for the colors and textures of the c-bars and h-bars may be modeled for an h-chart after the o-bars in a chart were grouped by into categories and assigned to series. For example, the h-charts can be configured for grouping the bars observed in a chart into categories comprising a predefined number of bars per category. The image analysis method further comprises determining the most frequently occurring colors or textures of all bars at a particular position within all categories (and thus corresponding to the same series), and using the frequency of most frequently observed color at said position for computing the probability of observing said color at said position in the bars of the categories of the observed chart.

According to some embodiments, the image analysis method comprises identifying all colors and/or textures of o-bars and o-bar segments during the image analysis and creating, for each combinatorically possible combination of colors and/or textures and already generated h-charts, an extended set of h-charts wherein each identified non-constraint violating grouping of c-bars is stored in multiple h-chart versions, each h-chart version having a different color scheme.

According to still alternative embodiments, the image analysis method comprises, after having created an h-chart that groups all c-bars that are mapped to an o-bar into categories without violating a constraint, identifying, for each category position, the color of the majority of o-bars located at said category position. This color is used as the most probable color for a particular category position and is stored in the h-chart. In case said h-chart is identified as the most probable h-chart, said color and texture of said particular category position will be assigned to all o-bars to which h-bars at said category position are mapped.

For example, the image analysis method may have created an h-chart that groups 15 c-bars into five categories, each category having three bar positions respectively corresponding to a c-bar. At least one of the c-bars per category are mapped to a respective o-bar. The image analysis method may comprise determining that the majority of o-bars which are mapped to the first bar position in said 5 categories have green color, the majority of o-bars which are mapped to the second bar position in said 5 categories have petrol color, and that the majority of o-bars which are mapped to the third bar position in said 5 categories have blue color. The generated h-chart will be configured thus that it assigns green color to all first h-bars of a category, petrol color to all second h-bars of a category and blue color to all third h-bars of a category. Of course, said colors are merely provided as example and any other color or texture may likewise be used.

According to embodiments, the method comprises identifying the plurality of o-bars in the chart by applying a segmentation method on the chart.

According to embodiments, the segmentation method comprises:
  a. providing a plurality of bar segment models and background segment models, each bar segment model being descriptive of pixel properties of a bar region s, each bar segment model having assigned a probability function that outputs, for any input pixel region s, a probability $P(I(s)|Mi)$ that indicates for said pixel region (i.e., segment candidate) the probability that said model Mi generates the pixel properties of said chart image pixel region $I(s)$;

each background segment model Mi being descriptive of pixel properties of a chart background region s, each background segment model having assigned a probability function that outputs, for any input pixel region s, a probability $P(I(s)|Mi)$ that indicates for said pixel region (i.e., segment candidate) the probability that said model Mi generates the pixel properties of said chart image pixel region $I(s)$;

the probability functions of each bar segment model and each background segment model fulfilling the condition that a first probability that is output by said model for generating a particular set of pixel properties for a first pixel matrix is higher than a second probability that is output by said model for generating said particular set of pixel properties for a second pixel matrix being a proper superset of the first pixel matrix.

Said segmentation approach may be beneficial as said models are based on the assumption (illustrated in FIG. 8) that the probability of occurrence of a sub-segment is always greater than the probability of occurrence of the respective (super)segment. Probability functions implementing this assumption thus allow to re-use previously computed probabilities of a sub-segment of a particular segment candidate as a rough estimate of the upper possible probability value for said particular segment candidate. If this upper possible probability value is considered too low, a whole branch of computational operations may be skipped automatically by a dynamic programming algorithm, thereby tremendously increasing performance and saving CPU power.

In simple cases, the bar chart may consist of unsegmented bars, i.e., each bar consists only of a single segment.

According to embodiments, the segmentation method comprises searching a horizontal search space representing a horizontally oriented image or sub-image ranging from pixel position $x=0$ to $x=$width of the image. Thereby the one or more processors performing the segmentation method use a first dynamic programming algorithm for identifying the most probable horizontal segmentation of the horizontally oriented sub-image, the most probable horizontal segmentation being indicative of the most probable vertically oriented left and right segment borders of any segment identified in the horizontal search space. Said first dynamic programming algorithm computes a probability that a currently examined segment candidate between a left candidate segment border cut $c_{left}$ and a right candidate segment border $e_{right}$ represents a true segment of the image, thereby using previously computed probabilities for one or more sub-segments contained within said segment candidate for reducing computations while searching the horizontal search space. The probabilities for at least some of the one or more sub-segments have already been computed previously when examining a segment candidate between previously defined left and right segment borders $c_{left\_prev}$, $e_{right\_prev}$. If the probabilities for the sub-segments are too low, the computation of the currently examined segment is skipped.

According to preferred embodiments, the above method is performed for segmenting bars of a vertical bar chart.

According to embodiments, the segmentation method comprises searching a vertical search space representing a vertically oriented image or sub-image ranging from pixel position $y=0$ to $y=$height of the image. Thereby the one or more processors performing the segmentation method use a second dynamic programming algorithm for identifying the most probable vertical segmentation of the vertically oriented sub-image, the most probable vertical segmentation being indicative of the most probable horizontally oriented bottom and top segment borders of any segment identified in the vertical search space. Said second dynamic programming algorithm computes a probability that a currently examined segment candidate between a bottom candidate segment border cut $c_{bottom}$ and a top candidate segment border $e_{top}$ represents a true segment of the image, thereby using previously computed probabilities for one or more sub-segments contained within said segment candidate for reducing computations while searching the vertical search space. The probabilities for at least some of the one or more sub-segments have already been computed previously when examining segment candidates between previously defined bottom and top segment borders $c_{bottom\_prev}$, $e_{top\_prev}$. If the probabilities for the sub-segments are too low, the computation of the currently examined segment is skipped.

According to preferred embodiments, the above method is performed for segmenting bars of a horizontal bar chart.

According to embodiments, the first and the second dynamic programming algorithm are executed in a nested manner by a segmentation procedure.

For horizontal bar charts, the second dynamic programming algorithm (from bottom to top or vice versa) is performed in an outer loop. The first dynamic programming algorithm (from left to right or vice versa) is performed in an inner loop. The segmentation procedure uses the probability of the least probable sub-segment for estimating the maximum possible probability for said segment candidate to be a real segment of the bar chart. The sub-segment lies totally inside the candidate segment and is defined by bottom $c_{bottom\_prev}$ and top $e_{top\_prev}$ segment borders and by left $c_{left\_prev}$ and right $e_{right\_prev}$ segment borders. The segment candidate is defined by left and right segment borders $c_{left}$, $e_{right}$ and is defined by bottom and top segment borders $c_{bottom}$, $e_{top}$. The probability of the sub-segment having been computed in previous iterations of the inner and outer loop. Thereby, all sub-segments examined for identifying the least probable sub-segment are "true sub-segments" of the segment candidate. This means that the sub-segments totally lie inside the segment candidate.

For horizontal bar charts, the probability for any sub-segment within the horizontal search space within borders $c_{bottom\_prev}$, $e_{top\_prev}$-currently defined and examined by the second dynamic programming algorithm is computed by running the first dynamic programming algorithm on this sub-segment for horizontal segmentation, i.e. for finding the best horizontal segmentation of that sub-segment and for computing and returning its probability, thereby also determining via the second dynamic programming algorithm the best vertical segmentation for a currently examined segment having a cut c as candidate left border and a current extent e as candidate right border, Thus, the overall probability of a segment defined by the left and right segment borders $c_{left\_prev}$, $e_{right\_prev}$ and defined by the bottom and top segment borders $c_{bottom\_prev}$, $e_{top\_prev}$ depends on the best horizontal and vertical segmentation results obtained by the first and second dynamic programming algorithm.

The identification of bottom and top segment borders is performed (essentially) in the same manner as the identification of the left and right segment borders in a nested manner. Finding bottom and top segment borders corresponds to finding vertical extension of bars and inter-bar spaces. Finding left and right segment borders within horizontal pixel stripes examined during the "vertical walk" corresponds to finding the horizontal extension of the bars and bar segments.

According to another embodiment, the chart is a vertical bar chart being segmented by a segmentation procedure. The first dynamic programming algorithm (from left to right or vice versa) is performed in an outer loop. The second dynamic programming algorithm is performed in an inner loop. The segmentation procedure uses the probability of the least probable sub-segment for estimating the maximum possible probability for said segment candidate to be a real segment of the bar chart. The sub-segment lies totally inside the candidate segment and is defined by bottom $c_{bottom\_prev}$ and top $e_{top\_prev}$ segment borders and by left $c_{left\_prev}$ and right $e_{right\_prev}$ segment borders. The segment candidate is defined by left and right segment borders $c_{left}$, $e_{right}$ and is defined by bottom and top segment borders $c_{bottom}$, $e_{top}$. The probability of the sub-segment having been computed in previous iterations of the inner and outer loop. Thereby, all sub-segments examined for identifying the least probable sub-segment are "true sub-segments" of the segment candidate.

Computing the left, right, bottom and top segment boundaries and the probabilities of segment candidate defined by said left, right, bottom and top boundaries in a nested manner may be advantageous as the image comprising the chart may be segmented completely within a single search procedure both horizontally and vertically. For example, the search may start in horizontal direction for identifying left and right segment borders, and at each currently examined pair of left and right segment border $c_{left}$, $e_{right}$, the execution of a search in vertical direction for identifying bottom and top segment border candidates $c_{bottom}$, $e_{top}$ may be started. After having searched the complete image from left to right for left and right segment borders, also the search from the bottom to the top of the image for identifying the bottom and top segment boundaries will have completed.

A vertical bar chart is constructed as a set of horizontally grouped stripes of vertically stacked bars (the stacking includes some background segment on top and bottom of a bar segment, and optionally also the stacking of multiple bar segments.

Therefore, the search preferentially starts in horizontal direction from left to right for vertical bar charts for identifying vertical stripes corresponding to bars and inter-bar spaces. The search preferentially starts in vertical direction from the bottom to the top of the image for horizontal bar charts for identifying horizontal stripes corresponding to bars and inter-bar spaces. The search for the stripes corresponding to the bars and inter-bar stripes represents the outer loop. In the inner loop, the segments within said stripes are identified.

According to embodiments, a segmentation algorithm ("SEG") is used for performing the segmentation. The SEG algorithm takes the following objects as input:

an arbitrary sub-image of the digital image of the chart; the sub-image can be, for example, a pixel stripe, e.g. a horizontal pixel stripe that covers the width of the chart image or a sub-sub-image thereof (e.g. a segment candidate between a cut and an extent); the height of said stripe may be dynamically determined by performing the image segmentation algorithm in vertical direction in a nested manner; thus, the height of the horizontal pixel stripe may be determined by a cut and extent pair of a vertically executed segmentation of the image;

a segmentation direction; and a probability function which is configured to use pixel data of the sub-image as input and to compute, for a plurality of different cuts and extents and for said sub-image, an (exact) probability value that a candidate segment within said sub-image between one of said cuts and one of said extents is a single segment having some predefined properties (e.g. red color); by identifying one or more probability functions from different models having computed the highest probability for the current sub-image, the most probable segment borders (oriented orthogonally to the segmentation direction) within the sub-image can be identified; for example, in case a horizontal pixel stripe is input as the sub-image into the SEG algorithm, the one or more probability functions which return the highest probability values and the one or more extents which were the basis for computing said highest probability values and which correspond to identified segment borders are identified and represent the best segmentation in the segmentation direction; the models are configured such that a lower probability is computed for any segment than for any of its true sub-segments (segments being smaller than the super-segment and being completely contained within said super-segment).

The segmentation algorithm ("SEG") will output and return all segment borders having been identified along the segmentation direction and the total probability of a segmentation of the sub-image according to said segment borders.

For example, the sub-image spans the whole image width (e.g. 100px) and is 10px high. The image analysis logic may comprise a plurality of different models explaining some pixel region by probability functions. A "green" model consists a probability function that assumes that an image region is green and computes a probability value that positively correlates with the fraction of green pixels in the sub-image. A "red" model is a probability function that assumes that an image region is red and computes a probability value that positively correlates with the fraction of red pixels in the sub-image. The green probability function may have computed a high probability for a green segment ranging from x=1 to x=extent e=40 but may have computed a low probability for a segment in the sub-image area ranging from x=41 to 100 being green. To the contrary, the red probability function may have computed a low or zero probability for a segment ranging from x=1 to x=extent e=40 being red, but may have computed a high probability for a red segment in the sub-image area ranging from x=41 to 100. Thus, the total probability may be a product of the probability provided by the red probability function and the green probability function, and a segmentation that corresponds to a green segment from 1 to 40 and a red segment from 41 to 100 may be returned as the best segmentation result for said horizontal search space. The probability models may be based on a statistical distribution, e.g. a Gaussian distribution of color values.

In the simple case of unsegmented bars, the segmentation is performed merely for separating background segments from bars. In the case of segmented bar charts, multiple bar segments per bar may be identified, each segment position within the bars corresponding to a respective data series.

Performing the segmentation in x-and y-direction in a nested, iterative manner may be advantageous as not only the height of a bar segment but also its width is determined in a single run. It should be noted that although the horizontal pixel stripe that corresponds to the horizontal search space and that may be input to the SEG algorithm may be of arbitrary height, e.g., just a single pixel or the whole image height, the identification of horizontally oriented segment borders in a vertical pixel stripe is performed for the full height of the image irrespective of the height of the horizontal pixel stripe input to the SEG algorithm.

According to embodiments, the searching of the horizontal search space (i.e. from left to right) by the first dynamic programming algorithm comprises identifying the positions within the horizontal search where vertically oriented extents e acting as left segment borders and vertically oriented cuts c acting as right segment borders exist, the identification of said positions comprising:

a. in a first loop, for each extent e being a position in the horizontal search space from e=1 to e=width of the image, do:
b. in a second loop, for each cut c being a position in the horizontal search space from c=e−1 to c=0, do:
c. get P_UB_left, whereby P_UB_left is an upper possible bound of the probability that a sub-segment ranging from c to e−1 represents a true segment of the image, the P_UB_left having been computed already in the previous iteration through the first loop for the extent e_prev=e −1 and for all possible cuts c_prev from c prev=e−2 to c prev=0; thus, the value for P_UB_left is read from a variable that was assigned a value in the previous iteration through the first loop; for example, if the current cut c=47 and the current extent e=50, then P_UB_left is an upper possible bound of the probability that a sub-segment ranging from 47 to 49 represents a true segment of the image (at the currently examined horizontal search space); in the very first iteration of the first loop there does not exist a previous value; in this case, "1" can be used as a default value for P_UB_left;
d. get P_UB_right, whereby P_UB_right is an upper possible bound of the probability that a sub-segment ranging from c+1 to e represents a true segment of the image, whereby P_UB_right is an estimate value having been computed already in the previous iteration through the second loop for the current extent e and for the cut c_prev=c+1; for example, if the current cut c=47 and the current extent e=50, then P_UB_right is an upper possible bound of the probability of a sub-segment ranging from 48 to 50 represents a true segment of the image (at the currently examined horizontal search space); P_UB_right is an estimate value having been computed already in the previous iteration through the second loop for the current extent 50 and for the cut c_prev=48; thus, the probability of the existence of a bar segment between pixels 47-50 is estimated based on the probability of a segment from pixels 48 to 50 which is computed in the previous second loop iteration; in the very first iteration of the second loop there does not exist a previous value; in this case, "1" is used as a default value for P_UB_right;
e. compute P_UB_NSegm as the minimum of P_UB_left and P_UB_right, wherein P_UB_NSegm represents an upper possible probability that the pixel sub-segment between c and e represents a true segmentation of the image; thus, in the current example, P_UB_NSegm represents an upper possible probability that the pixel sub-segment between 47 and 50 represents a true segmentation of the image;
f. determine if the product of the P_UB_NSegm and P_best_leftside is not smaller than Pcomp(e),
    i. wherein P_best_leftside is the probability of the most probable segmentation of the horizontal search space from 0 to c obtained from previous iterations in the first and second loop, and ii. wherein Pcomp(e) is the probability of the best already found segmentation of the sub-segment ranging from 0 to e; in the present example at a current cut c=47 and a current extent e=50, P_best_leftside is the probability of the most probable segmentation of the horizontal pixel stripe from 0 to 47 obtained from previous iterations in the first and second loop; the "most probable segmentation" may correspond to a single segment between 0 and 47 or may correspond to multiple segments between 0 and 47 depending on the particularities of the pixel intensities of the horizontal stripe examined; Pcomp(e) is the probability of the best already found segmentation of the image sub-segment ranging from 0 to e (in the current example: ranging from 0 to 50); thus, the variable Pcomp(e) is initiated by storing a lower probability boundary value, e.g. 0; the value Pcomp(e) is replaced in case a not-worse segmentation between 0 and e is found e.g. from 0-50; (thereby, a "not-worse segmentation" relates to a segmentation with a probability not lower than the current Pcomp(e) value is found);

g. only in case said product is not smaller than Pcomp(e):

h. recompute P_UB_NSegm exactly, the exact, recomputed P_UB_NSegm representing the exact probability that the sub-segment between c and e represents a true segment of the image, the recomputation comprising comparing results of probability functions assigned to a plurality of segment models under the hypothesis that a true segment exists between c and e, the exact computation of P_UB_NSegm using pixel data of the horizontal search space of the image as input;

i. determine if the product of the recomputed P_UB_NSegm and P_best_leftside is not smaller than Pcomp(e);

j. selectively if said product is not smaller than Pcomp(e), store said product as new Pcomp(e) for the given extent e to be used as P_best_leftside in later iterations of the first and second loop; and updating a result list of vertically oriented segments borders by adding the identified left and right segment borders c and e.

According to embodiments, the exact recomputation of P_UB_NSegm comprises searching the vertical search space (a vertical pixel stripe comprising the currently examined segment candidate between c and e) for identifying bottom and top segment borders of the currently examined candidate segment. The value of the exact P_UB_NSegm depends on the probability to generate a matrix of image pixels covered by the horizontal and the vertical pixel stripe used as the search spaces, whereby the vertical pixel stripe may have a with that starts at the current cut c and ends at the current extent e.

According to embodiments, the searching of the vertical search space (e.g. from the bottom to the top of the image) by the second dynamic programming algorithm comprising identifying the positions within the vertical search space where horizontally oriented extents e acting as top segment borders and horizontally oriented cuts c acting as bottom segment borders exist, the identification of said positions comprising:

a. in a first loop, for each extent e being a position in the vertical search space from e=1 to e=height of the image, do:

b. in a second loop, for each cut c being a position in the vertical search space from c=e−1 to c=0, do:

c. get P_UB_bottom, whereby P_UB_bottom is an upper possible bound of the probability that a sub-segment ranging from c to e−1 represents a true segment of the image, the P_UB_bottom having been computed already in the previous iteration through the first loop for the extent e_prev=e−1 and for all possible cuts c_prev from c_prev=e−2 to c_prev=0; thus, the value for P_UB_bottom is read from a variable that was assigned a value in the previous iteration through the first loop; for example, if the current cut c and the current extent are used, then P_UB_bottom is an upper possible bound of the probability that a sub-segment ranging from c to e-1 represents a true segment of the image (at the currently examined vertical search space); thus, the value for P_UB_bottom is read from a variable that was assigned a value in the previous iteration through the first loop (as explained analogously for the horizontal search space); in the very first iteration of the first loop there does not exist a previous value; in this case, "1" can be used as a default value for P_UB_bottom;

d. get P_UB_top, whereby P_UB_top is an upper possible bound of the probability that a sub-segment ranging from c+1 to e represents a true segment of the image, whereby P_UB_top is an estimate value having been computed already in the previous iteration through the second loop for the current extent e and for the cut c_prev=c+1; thus, the probability of the existence of a bar segment between pixels e and c_prev which is computed in the previous second loop iteration; in the very first iteration of the second loop there does not exist a previous value; in this case, "1" can be used as a default value for P_UB_top;

e. compute P_UB_NSegm as the minimum of P_UB_bottom and P_UB_top, wherein P_UB_NSegm represents an upper possible probability that the pixel sub-segment between c and e represents a true segmentation of the image;

f. determine if the product of the P_UB_NSegm and P_best_lowerside is not smaller than Pcomp(e), g. wherein P_best_lowerside is the probability of the most probable segmentation of the vertical search space from 0 to c obtained from previous iterations in the first and second loop, and h. wherein Pcomp(e) is the probability of the best already found segmentation of the sub-segment ranging from 0 to e;

i. only in case said product is not smaller than Pcomp(e):

j. recompute P_UB_NSegm exactly, the exact, recomputed P_UB_NSegm representing the exact probability that the sub-segment between c and e represents a true segment of the image, the recomputation comprising comparing results of probability functions assigned to a plurality of segment models under the hypothesis that a true segment exists between c and e, the exact computation of P_UB_NSegm using pixel data of the vertical search space of the image as input;

k. determine if the product of the recomputed P_UB_NSegm and P_best_lowerside is not smaller than Pcomp(e);

l. selectively if said product is not smaller than Pcomp(e), store said product as Pcomp(e) for the given extent e to be used as P_best_lowerside in later iterations of the first and second loop; and updating a result list of horizontally oriented segments borders by adding the identified bottom and top segment borders c and a Looping through cuts c and extents e as described above may be advantageous as a highly efficient and robust chart segmentation algorithm is provided. The algorism is strongly based on reusing probability values having already been computed in a previous iteration as an estimate value. The previously computed estimate values are used for dynamically deciding if an exact but computationally demanding probability computation for the existence of a particular chart segment shall be performed. The exact probability that the pixel sub-segment between c and e represents a true segment of the image is computed by applying segment models Mi to the pixel sub-segment, comparing results of probability functions under the hypothesis that a true segment exists between c and e with pixel data of the horizontal pixel stripe of the image.

For example, a plurality of probability functions P(I(c,e)|Mi) may be maintained and executed by a computer system configured to perform the image analysis and/or segmentation method described for embodiments of this invention. Each of said probability functions may have assigned a particular color and/or texture, a segment height, a segment width, and further parameters, and may compute the probability that a (background or bar) segment exists between a particular cut c and a particular extent e in the (sub-)image I that has the assigned color and/or texture. The computer system identifies the one of the probability functions and corresponding segment models that generates the highest probability for the pixel colors and/or pixel blob borders that are actually observed in the chart in the image.

For example, the model M for a red bar could comprise a probability function in the form of a Gaussian distribution for the color red having a mean value (255, 0, 0). Said mean value corresponds to the RGB representation of the color "red". The variance of said Gaussian distribution for the red color bar model may be set to sigma=20. The probability for the existence of a segment comprising a set of pixels is computed by multiplying all probability values obtained for each of the pixels in said set returned by the Gaussian distribution for the red color bar. If a pixel in the "observed" bar in the image has a red color, e.g. has an RGB value of (255, 0, 0), (255, 3, 2) or (254, 1, 6), the Gaussian model will return a high probability value for said pixel. If a pixel has a different color, e.g. (23, 217, 102), (14, 156, 233) or (14, 244, 102), the probability value for said pixel will be comparatively low. So in case the majority of the pixels in the o-bar in fact have a green color, the likelihood for the existence of a red segment will be low. However, the likelihood of a corresponding probability model for a green bar segment will return a high probability.

In addition to the color-based models described above, similar models Mi may be used for describing textures (patterns of intensities) and segment borders (e.g. outer pixels are black in accordance with a Gaussian distribution, the inner pixels of the model are of a particular color in accordance with a Gaussian distribution).

Any of the probability functions used fulfill the condition that the probability a model predicts for a particular segment is always smaller than the probability said model predicts for a sub-segment of said segment.

As can be derived easily, the exact computation of the likelihood of a segment by processing pixel properties, e.g, the color, provides highly accurate probability values but is computationally demanding. However, the comparison of the probabilities and predictions of the probability functions with the actually observed pixel intensity information is computationally demanding. Embodiments of the invention compute the exact probability value only in case the product of the P_UB_NSegm and P_best_leftside is not smaller than Pcomp(e), thereby avoiding the computation of the exact probabilities in many cases. Thus, embodiments of the invention allow to re-use probability values having already be computed for sub-segments of a candidate segment for deciding if an exact probability should be computed for a segment candidate or if the segment candidate can be ignored as the likelihood for the segment candidate being a real segment will never exceed an already computed upper probability boundary. Thus, computational resources may be saved and an efficient segmentation algorithm may be provided.

According to some embodiments, the above-mentioned probability values are specified as log-probabilities (log (P1*P2)=ln P1+ln P2). Thus, products of probabilities are replaced by sums of log-probabilities. This may have the advantage that a higher precision of the computed probability values is achieved as products of small numbers get extremely small and extremely small values may be affected by rounding operations and arithmetic underflows. To prevent such effects, more memory and CPU time is needed to process also very small numbers correctly. By using log-probabilities, the precision of probability computation may be improved without noticeably increasing memory and CPU consumption.

A horizontal bar chart and a vertical bar chart differ from each other basically only in respect to their orientation (one being rotated by 90° compared to the other chart type). Therefore, any example and assertion given herein for a horizontal bar chart likewise applies to a vertical bar chart rotated by 90° and vice versa.

According to embodiments, the image analysis comprises the use of h-charts for assigning o-bars to series and categories and for extracting said assignment and further information automatically from the chart of a digital image. In addition, or alternatively, the image analysis comprises the performing of the horizontal or vertical segmentation or a combination thereof for identifying the o-bars in the image. The image analysis method can be implemented and performed, for example, on a standard computer system, on a cloud service environment or on a handheld, battery powered mobile telecommunication device, e.g. a smartphone or tablet computer. The digital image may be a digital image of any format, in particular .jpg, .tif, .png or the like. The digital image may be a scan of a printed chart or an image of a chart displayed by any local or remote application program on the screen of the image analysis system. Performing the method according to embodiments of the invention on a mobile handheld telecommunication device may be particularly advantageous because said devices typically comprise only limited computational resources.

According to embodiments the image analysis method and the h-chart generation is instantiated on a data processing machine comprising a plurality of processing units. The comparison of h-chart-based grouping of h-bars with the identified, "observed" bars is performed by the plurality of processing units in parallel. For example, a first processing unit compares all h-charts that specify that there exist 3 bar positions (series) per category with the bars in the "observed chart". A second processing unit compares all h-charts that specify that there exist 4 bar positions (series) per category with the bars in the "observed chart". A third processing unit compares all h-charts that specify that there exist 5 bar positions (series) per category with the bars in the "observed chart". And so on. Further parallelization approaches may be implemented based on the parallel comparison of the colors of the observed bars with the most probable color of the h-chart. For example, an h-chart assuming red as the most probable color for a particular h-bar may be compared with the color of the observed bars in parallel to the comparison of a further h-chart assuming blue as the most probable color for a particular h-bar. The red-color and the blue-color h-chart may be evaluated in parallel. Thus, the speed of the identification of the h-chart whose bar grouping, color and texture generates a chart that is most similar to the bars in the observed chart may be significantly increased.

According to embodiments, the extracted data is imported into a spreadsheet application, a charting application, an application for generating a presentation or any other kind of office application program. For example, the data can be exported as a .csv file to Microsoft Excel, PowerPoint or OpenOffice. For example, the extracted data is automatically copied to the clipboard for manually pasting the numbers in the form of a table in a document of an arbitrary application program, in particular a spreadsheet application program like Excel. The program receiving the extracted data may be configured and used for automatically creating a new chart from the extracted data. According to some examples, the user may configure the program receiving the extracted data such that the new chart is generated in accordance with a predefined and/or user selected layout. For example, the colors of the chart may be the colors in accordance with a corporate design of a company. Thus, charts published in many different layouts and color schemes in many different media may be used for creating charts in a desired layout and color scheme highly efficiently.

According to embodiments, the chart whose data is to be extracted is a vertical or horizontal bar chart. This may be advantageous as bar charts are commonly used. The extraction of data from bar chart has often been reported to be difficult due to problems to correctly identify the series and category to which a particular bar belongs. Embodiments of the invention may allow the extraction of data from bar charts in an efficient, error robust and accurate manner.

According to embodiments, the extracted numerical data comprises in particular numerical data being indicative of the quantity of one or more elements of a data series; for example, the numerical data could be the numerical values displayed above or over a bar or bar segment which represent the amount of an item represented by said bar or bar segment. The numerical data could be extracted using an optical character recognition technique. Likewise, the numerical data could be computationally derived from the height of a bar as a bar's height is in proportion to the amount of the item represented by the bar. In this case, the height can be determined by an image segmentation algorithm.

According to embodiments, the extracted data is a tabular data structure that represents each category of the analyzed chart as a column and each series of the analyzed chart as a row or vice versa. The tabular data may comprise a numerical data value in each table cell. The outputting of the extracted data comprises exporting the extracted data into a first application program configured for automatically generating charts from tabular data structures; and generating, by the first application program, a new chart from the extracted data.

In addition, or alternatively, the outputting of the extracted data comprises exporting the extracted data into a second application program configured for automatically analyzing numerical data contained in tabular data structures; and outputting, by the second application program, a numerical result generated by the analysis of the extracted data.

For example, the first application program may be Microsoft PowerPoint or Microsoft Excel which enables a user to select a table and generates a new chart within PowerPoint from the data in a selected table with a very limited set of user interactions. The second application can also be Excel or a statistical or mathematical application whose inbuilt or predefined mathematical functions (SUM, AVERAGE, user-defined) may be applied to the data.

A "chart", "digital chart" or "chart image" as used herein is a graphical representation of data. A chart can be, in particular, a horizontal or vertical bar chart, A chart can be used as input for extracting data. It does not relate to a special data object used by a charting application for processing and manipulating charts wherein the graphical chart elements and corresponding numerical data values are already stored in a well-organized, structured manner.

The chart may be a graphical representation of any kind, e.g. a vector graphic or a pixel graphic, e.g. a .jpg file, e.g. a scan of a newspaper chart image or a picture provided by a remote server and presented in a browser. The chart may be displayed by the operating system alone or in interoperation with any kind of application program, e.g. a presentation program, a spreadsheet program, a browser, etc.

The tabular data format may be, for example, a table or data in .CSV format which can be used by many data analysis programs (e.g. Excel, PowerPoint, OpenOffice etc.).

A "series" as used herein is a set of data values, in particular number values that characterize a property of a particular class of objects. A chart can comprise multiple series. For example, a bar chart may be descriptive of the gender of the students participating in four courses "biology", "math", "computer sciences" and "physics". The chart may comprise four groups (or "categories") of bars for the four courses. Each group of bars may consist of 1.0 exactly two bars, a first one representing the number of female participants and the second one representing the number of male participants. Thus, the first series of the chart corresponds to the totality of female students and is represented in the form of four separate bars in the first position of each category. The second series of the chart corresponds to the totality of male students and is represented in the form of four separate bars in the second position of each category, A "category value" as used herein is an attribute used for grouping numerical values of at least one series, whereby the numerical values of said at least one series which have assigned the same category value are aggregated and the aggregated values for said category are represented by graphical chart elements, whereby said graphical elements of one category do not overlap with said graphical elements of any other category. For instance, a "category" is a group of one or more bars in a bar chart. Each bar represents the numerical value of one series for said category. The number of bars per category in a chart is constant but some bars may have a height of "0" and may not be visible. For example, the height of the first bar of the category "math" in the above example represents the total number of female students participating in the math course ("math" is the attribute shared by all female students counted for plotting said bar).

An "o-bar", also referred to as "observed bar" or "visible bar" is a region of a digital image that was identified by an image analysis method, e.g. a segmentation method, as a bar of a chart. An o-bar of a chart can be viewed ("observed") by a user if the chart comprising the o-bar is presented on a display device.

An "h-bar" or "hypothetical bar" as used herein is a data object having at least a width and optionally also a color and/or a texture and a height. An h-bar represents a bar in an h-chart. Each h-bar may correspond to an "observed" bar in the chart or may correspond to one of the c-bars that is not mapped to an o-bar, i.e. having been inserted in the gaps before, between and after the observed bars in the observed chart.

Figure 3:
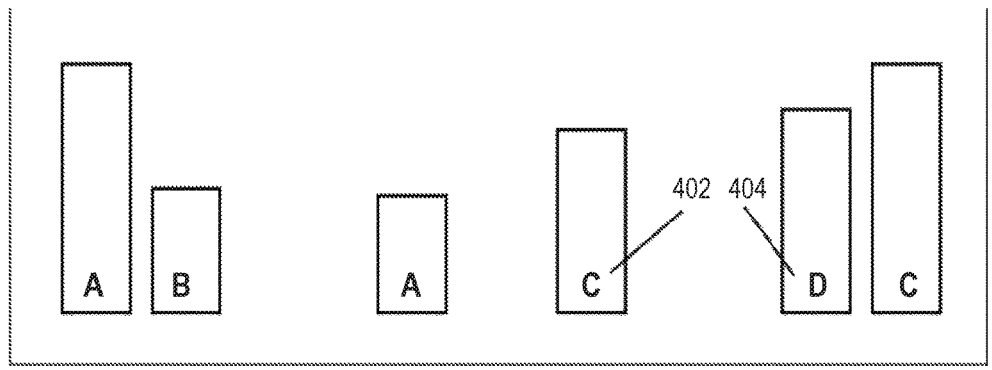
FIG. 3A depicts a series of "observed" bars contained in a chart depicted in a digital image.
FIG. 3B depicts a hypothesis chart comprising three bars (h-bars) per category.
FIG. 3C depicts differences between the "observed" bars and the h-bars in the hypothesis chart.
Figure 3:
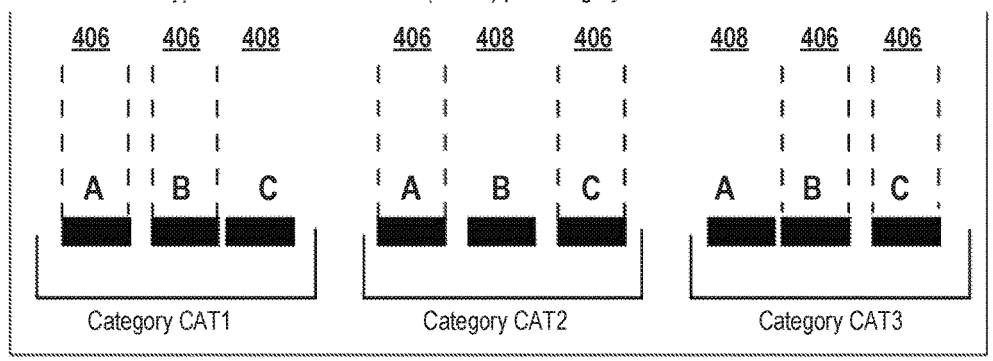
Figure 3:
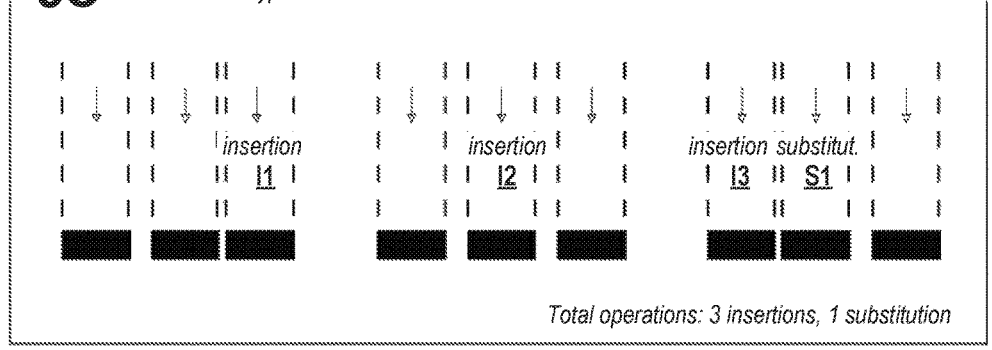

A "hypothesis chart" or "h-chart" as used herein is a data object that specifies a sequence of h-bars, that specifies a particular way of grouping the h-bars into categories, that assigns one or more expected, series-specific colors or textures to the grouped h-bars depending on the position of the h-bars in a category and that comprises an injective mapping from the o-bars to the h-bars such that each o-bar has assigned exactly one of the h-bars of the hypothesis chart; however, there may exist h-bars in a hypothesis chart that are not mapped to a corresponding o-bar. A hypothesis chart can be considered as a model for a chart, in particular a vertical or horizontal bar chart. For example, the model may specify that the bar comprises 5 categories with 3 different, series-specific bars per category. Hypothesis charts are generated for identifying the one hypothesis chart being most similar to the identified set of o-bars in a chart. For example, the o-bars can be identified by applying an iterative segmentation algorithm as described herein for embodiments of the invention. Thus, an h-chart can be described as a data object that represents a (hypothetical) chart comprising a plurality of h-bars (hypothetical bars) and comprising a specification of the location of the h-bars as well as of their coloring and their affiliation to a category and a series, together with an injective mapping from the "observed" bars to these bars (cf. FIG. 3$b$/3$c$).

A "c-bar" or "candidate bar" as used herein is a data object or part thereof that represents a bar position within a bar chart and that is specified in order to generate hypothesis charts. A sequence of c-bars is generated by representing all o-bars as c-bars and filling the gaps with as many c-bars as possible, whereby each c-bar has the same width as the o-bars. Optionally, additional c-bars are added to said sequence before the c-bar that corresponds to the leftmost o-bar and after the c-bar that corresponds to the rightmost o-bar. In case a grouping of c-bars into categories was found that is able to assign each c-bar that corresponds to an o-bar to a category of an h-chart without violating a constraint, said grouped c-bars become h-bars of said h-chart.

A "horizontal pixel stripe" of a chart image as used herein is a stripe of pixels covering the full width of the image, and covering one or more pixels in vertical direction. A horizontal pixel stripe can be segmented by identifying vertical segment borders, i.e., the "left" and "right" borders of a segment.

A "vertical pixel stripe" is a stripe of pixels covering the full height of an image, and one or more pixels in horizontal direction. A vertical pixel stripe can be segmented by identifying horizontal segment borders, i.e., the "top" and "bottom" borders of a segment.

An "extent" as used herein is a particular position along an axis of a pixel matrix, e.g. an image, which demarks the top border or right border of a pixel interval. For example, if the axis is a horizontal axis x spanning the image from left x=0 to right x='image width', the extent $e_{right}$ is a right border of a pixel interval starting at a currently examined position $x_{cur}$ (e.g. $c_{left}$). If the axis is a vertical axis y spanning the image from bottom y=0 to top y='image height', the extent $e_{top}$ is a top border of a pixel interval starting at a currently examined position $y_{cur}$ (e.g. $c_{bottom}$). The currently examined left and bottom border positions are also referred herein as "cuts". The pixel interval is also referred herein as sub-segment of a pixel region of said axis that spans the whole pixel matrix.

A "cut" as used herein is a particular position along said axis of a pixel matrix that demarks the bottom border or left border of said pixel interval. For example, if the axis is a horizontal axis x spanning the image from left x=0 to right x='image width', the cut $c_{left}$ is a left border of a pixel interval ending at a currently examined position $x_{cur}$ (e.g. $e_{right}$). If the axis is a vertical axis y spanning the image from bottom y=0 to top y='image-height', the cut $c_{bottom}$ is a bottom border of a pixel interval terminating at a currently examined position $y_{cur}$ (ag. $e_{top}$). The currently examined right and top border positions are also referred herein as "extents". The pixel sub-segment between the cut and the extent represents a segment candidate. The probability that said segment candidate represents a true segment that can be observed in the image is automatically computed either exactly or by using heuristics and estimate values, A "bar segment" as used herein is a sub-region of a bar within a chart, whereby the pixels of said sub-region share at least one common feature value, e.g. have a particular color or texture and border.

A "background segment" as used herein is a sub-region of a background region of a chart, i.e., a region that does not lie within a bar. The pixels of said sub-region cannot be explained as a bar segment by some bar segment model. For example, a segmentation algorithm may use different models Mi for background segments and bar segments, whereby the background segment models may have different colors and/or textures typically used in background regions of charts but not within the bars. Bar segment models may be based on colors and/or textures which are typical for bars, but not for background regions of a chart.

An "image" as used herein is a digital image. The image can be a pixel graphic, in particular a pixel matrix.

FIG. 1 depicts a display device 116, e.g. an LCD monitor, coupled to a computer system 122. The computer system comprises one or more processors and an image analysis application program or module. The display device comprises a first screen 104. The image analysis module is adapted for automatically extracting data from a chart in a digital image, e.g. by segmenting the image for identifying the bars of the chart and/or by generating h-charts and comparing the h-charts with the chart 110 in the image for assigning categories and series to the bars of the chart in accordance with the h-chart being most similar to the chart of the digital image. The image analysis program may enable a user to input the digital image of the chart in the form of an image or an image file.

Figure 2:
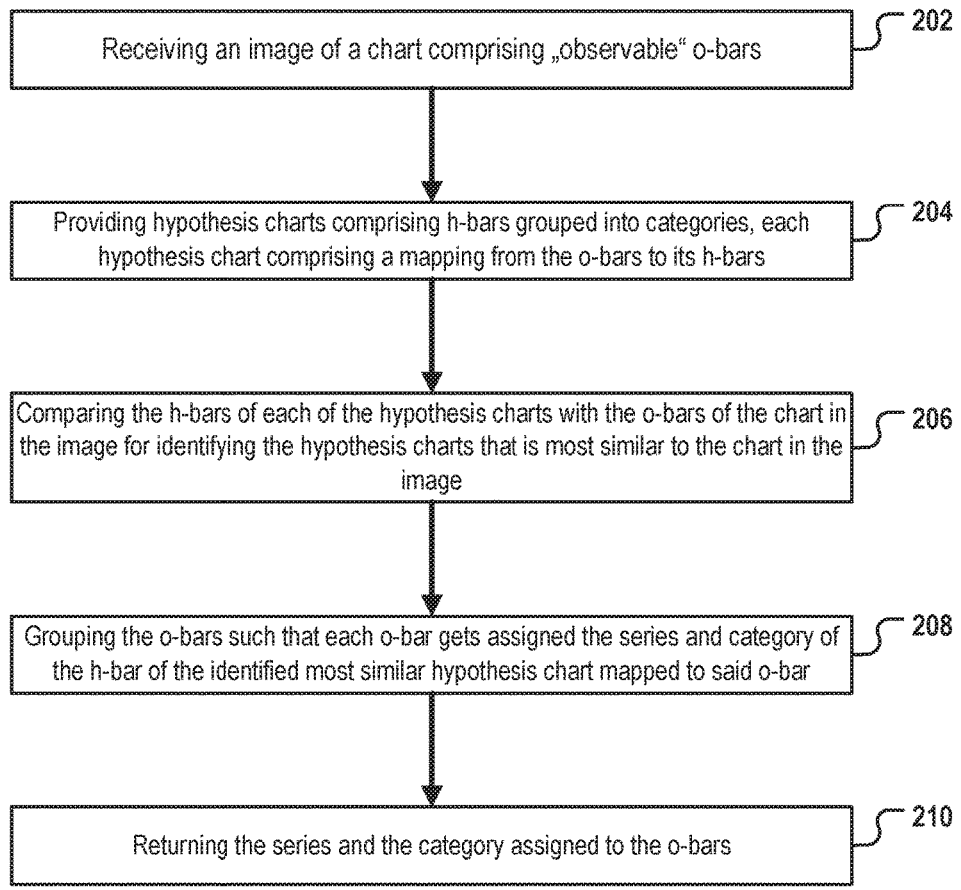
FIG. 2 depicts a flow chart of a method for grouping chart image elements into a chart.

FIG. 2 depicts a flow chart of a computer-implemented image analysis method for automatically extracting data from a chart. In a first step 202, the one or more processors executing the image analysis program logic receive a digital image of a chart. For example, the image may be read from a local storage medium, received from a remote client or server via a network connection or may be received in the form of an image. The image comprises a plurality of o-bars. Each o-bar is a set of pixels that can be displayed on a screen and represents a user-observable bar contained in the chart. In a further step 204, the one or more processors executing the program logic provide a plurality of hypothesis charts. For example, the hypothesis charts can be predefined and read from a storage medium or can be dynamically created for the received digital image. Each hypothesis chart is a data object that specifies a sequence of h-bars, that specifies a particular way of grouping the h-bars into categories, and that comprises an injective mapping from the o-bars to the h-bars such that each o-bar has assigned exactly one of the h-bars of said hypothesis chart. In step 206, the processor(s)

compare the position, color and/or texture of the h-bars of each of the plurality of hypothesis charts with the position, color and/or texture of their respectively mapped o-bars for identifying the one of the plurality of hypothesis charts that is most similar to the o-bars of the chart. The one or more processors in step 208 apply the grouping of the h-bars as specified in the identified most similar hypothesis chart on the o-bars such that each o-bar gets assigned the series and category of the h-bar of the identified most similar hypothesis chart mapped to said o-bar. Then in step 210, the processor(s) return the series and the category assigned to each of the o-bars by the identified most similar hypothesis chart.

FIG. 3A depicts a series of "observed" bars which were identified in a chart by applying some image analysis steps on a digital image comprising a bar chart. The o-bars may have been identified by applying a segmentation approach as described herein for embodiments of the invention. Alternatively, the bars may have been identified by conventional image processing techniques known in the art, e.g. connected component analysis, color or gradient-based image segmentation or the like. In the chart, 6 "observed" bars were identified. At this stage, the image analysis logic does not know if a gap e.g, between the second observed bar "B" and the third observed bar "A" correspond to a bar position of a bar having the height "zero" and/or if this gap represents the gap between two different categories. In other words, the question is if the chart should be interpreted such that there exist one or more further bars between the second and the third observed bar which has "zero" value or if there does not exist a bar because the gap corresponds to an inter-category gap.

It should be noted that the image analysis logic does not "know" how many categories actually exist in the chart and how many series per category exist in this chart. Rather, the number of categories per chart and the number of series per category has to be dynamically determined. This is achieved according to embodiments by providing a plurality of different h-charts specifying different groupings and optionally different numbers N of bars per category and by identifying the one of the h-charts whose h-bar grouping and colorization is the most similar to the observed chart and the o-bars contained therein.

This may be advantageous as it is not necessary that the user specifies how many bars and series exist in a chart, thereby reducing the necessary interaction and configuration steps between a user and the image analysis logic for enabling data extraction from a chart. The bar's color and texture information is represented in FIG. 3A by the letters A, B, C and D inside the o-bars, whereby equal letters indicate equal color and texture. The height of the bars is not relevant for determining the similarity between an h-chart and the "observed" bars as illustrated in FIGS. 3B and 3C.

A further important advantage is that the mapping of o-bars to series and categories is robust against color or texture variations which frequently occur in scanned chart images as the algorithm does not solely and strictly depend on the color or texture of the bars, but rather strongly on relative positions of the bars and a consistency model represented as a set of constraints. Thus, some bars may have different colors (e.g. when some bar is highlighted) and still be mapped to the same series.

FIG. 3B depicts a hypothesis chart (h-chart) that groups a plurality of h-bars into categories. As the bar position within a category specifies the series a bar belongs to, said grouping of h-bars into categories also assigns a series to each h-bar. Each category of the h-chart comprises at least one h-bar that is mapped to an o-bar depicted in FIG. 3A. This is indicated by the alignment of the black boxes representing the h-bars and the dotted vertical lines representing the outer borders of the o-bars depicted in FIG. 3a. The h-chart of FIG. 3b specifies a grouping of h-bars into groups of three h-bars per category and suggests the existence of three categories CAT1, CAT2 and CAT3 in the chart. The letters (corresponding to the color and texture of a bar) are indicative of the series which is assigned to the respective h-bar by the h-chart and its h-bar grouping specification. The assignment of a series and a category to an h-bar is transferred to the "observed" bars via the mapping between h-bars and o-bars.

The image analysis logic systematically searches for the best h-chart out of a plurality of predefined and/or dynamically generated h-charts by comparing sets of h-bars grouped in accordance with each of said h-charts with the attributes and the position of the "observed" bars of the chart. Said searching can be implemented as a back-tracking algorithm, in particular as a pruned back-tracking algorithm, whereby the "pruning" means that some h-chart comparison steps are skipped from the beginning if the grouping of bars according to said h-chart violates a constraint. The skipping of potential groupings is described in greater detail in FIG. 5 and FIG. 6.

To check all h-charts of interest in order to find the one which shows the highest similarity to the observed bars, defects of the h-chart are identified and used for aggregating defect scores for a particular h-chart. The aggregated defect score is used as a measure of dissimilarity or an inverse measure of similarity between the h-bars grouped according to an h-chart and the o-bars. The comparison of the h-chart based groupings and the defect scare computation can be performed by using a backtracking approach. According to preferred embodiments, the computation of the defect scores of the h-charts is performed in a depth first search manner, adding one category after the other in linear order to the h-chart in a "sliding window" approach described later. Thereby, the search and defect score computation is additionally pruned by rejecting or not even computing defect scores for those h-charts whose h-bar grouping violates one or mare constraints relating to chart design assumptions. For example, the h-chart creation as described in FIGS. 5 and 6 and the defect score computation may be performed together, whereby the grouping of c-bars that violates a constraint is not used for generating an h-chart and thus also not used for defect score computation.

FIG. 3C depicts the computation of defects of the h-chart depicted in FIG. 3b if compared with the o-bars in FIG. 3a. For example, the "total defect" (or "total defect score", "dissimilarity score" or "inverse similarity score") may be 4, as four operations are needed to bring the original chart into the form given by the h-chart. Instead of computing the sum, other aggregation functions may be used as well. For example, an insertion of an h-bar is needed in position 3 of the first category and in position 2 of the second category. Furthermore, an insertion of an h-bar in the first position of the third category and a substitution of color values in the h-bar in the second position of the third category is necessary. Preferentially, the height of the o-bars and/or h-bars is irrelevant for computing the defect score.

An Insertion defect is counted for each h-bar that is not be mapped to an o-bar. A substitution defect is counted for each h-bar with different coloring and/or texture than the corresponding o-bar in the observed chart. The totality of defects represents the number of insertion and substitution operations needed to transform the observed bars into the h-bars having been grouped into categories and "colorized" by the h-chart.

After having computed a defect score for all h-charts, the best h-chart is selected as that with minimal total defect score, which is the h-chart whose h-bar grouping is most similar to the pattern of the observed bars in the chart image.

According to embodiments, the creation of the hypothesis charts and the computation of a defect score for each h-chart are performed concurrently: after a group of c-bars has successfully been aligned to respective o-bars without violating a constraint, an intermediate defect score is computed immediately by comparing the h-bars of the partially created h-cart generated from the already assigned c-bars with the already aligned o-bars of the chart. Then, before a further group of c-bars is tentatively assigned to one or more o-bars, the intermediate defect score is compared with the total defect score of the "best matching" h-chart generated and identified so far. The "best matching" h-chart is the one having the lowest defect score. The grouping of further c-bars and the checking if the grouped further c-bars violate a constraint for generating a new h-chart is terminated automatically in case the intermediate defect score is larger or identical to the defect score of the "best matching" h-chart identified and generated so far, Said features may be highly advantageous as the generation of a new h-chart based on one or more already valid groupings can be terminated immediately if the defect score of the currently generated h-chart is known to be higher than the defect score of the best matching h-chart. This may significantly reduce CPU consumption and processing time.

In case more than one h-chart with minimal defect score was identified, the one with lowest number of series per category may be considered as the best h-chart.

The pruning when performing the search as described for FIG. 3b may comprise the evaluation of whether the space between adjacent h-bars of different categories is never smaller than space between adjacent bars within the same category, when taking into account all h-bars, i.e. visible and virtually added h-bars.

According to some embodiments, the defect score computation for h-charts specifying different N-s per category is executed on different processing units in parallel.

According to some embodiments, the total defect score is computed as a weighted sum of all insertion defects and all substitution defects. For example, a substitution defect may be weighted with "0.5" and an insertion defect may be weighted with "0.5", but other weighting schemes are possible, e.g. "0.3" and "0.7", etc.

The "hypothesis" of the "best" h-chart indicates to which category and series a particular observed bar belongs to. This information is used for generating the tabular data structure. For example, the numerical values of the respective bars are automatically extracted as described herein for embodiments of the invention. The extracted numerical values are stored in a tabular data structure whereby a numerical value extracted for a particular bar is stored in a cell in said tabular structure whose column (or row) corresponds to the category to which said bar is assigned by the "best" h-chart and whose row (or column) corresponds to the series to which said bar is assigned by the "best" h-chart, or vice-versa.

Figure 4:
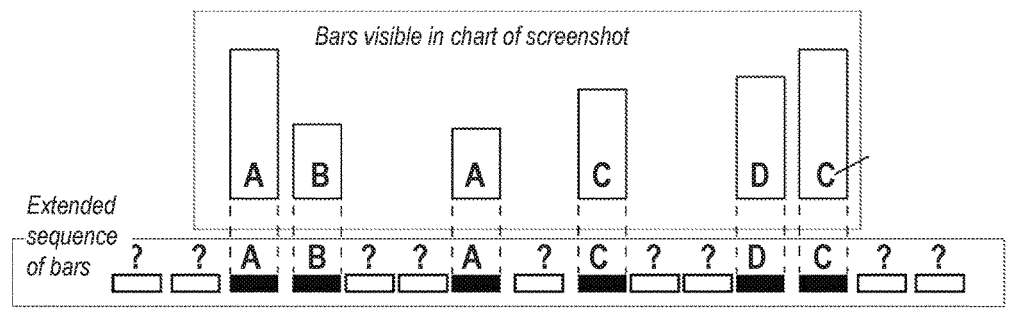
FIG. 4 depicts the creation of an extended sequence of h-bars to be grouped by one or more hypothesis chart.

FIG. 4 depicts the creation of an extended sequence of c-bars to be grouped in many different ways for testing if a chart construction constraint is violated and for creating a plurality of hypothesis charts. The gaps between the visible bars of FIG. 3a and some space at the begin and the end of the chart are filled with additional c-bars for generating a series of c-bars that is an "extended", filled-up version of the series of o-bars. The image analysis logic automatically identifies all possible groupings of c-bars that group all c-bars corresponding to an o-bar without violating a constraint and generates a respective h-chart. In each of the created h-charts, colors and textures are assigned to c-bars in accordance with a predefined color scheme or in accordance with a statistical evaluation of the most frequently observed color or texture at a particular bar position in all categories.

Figure 5:
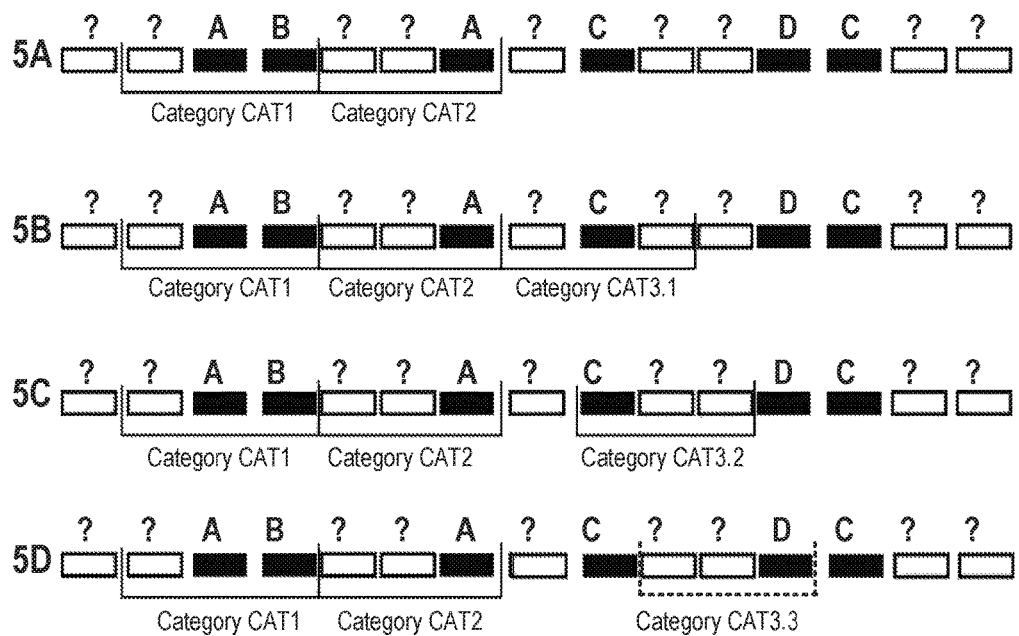

FIG. 5 depicts a "sliding window" approach for identifying c-bar groupings which do not violate a chart construction constraint and which are used as a basis for generating h-charts.

The constraints may comprise, for example, that each series appears not more than once per category and within the sequence of h-bars, the space between adjacent h-bars of different categories is never smaller than the space between adjacent h-bars within the same category. A series represented by a bar or bar segment can be determined by said bars or bar segment's filling characteristics and/or its relative position in a category. The image analysis logic groups the c-bars of the extended sequence of o-bars into categories by finding c-bar groupings that do not violate a chart design constraint. One of the constraints may be that there must be fewer bars per category than the number of o-bars as otherwise all o-bars may fit into a single category with total defect score "0" instead of being grouped into a plurality of categories, e.g. by assigning exactly one o-bar to each category.

At first, a search space for identifying valid c-bar groupings is generated in the form of a sequence of c-bars, i.e. as a sequence of bars that represent and are mapped to o-bars and further bars that are inserted in-between said bars by filling gaps in the sequence of existing o-bars. In addition, at the end and at the beginning of the observed bars, additional c-bars are added when generating the sequence of c-bars. Adding additional c-bars at the and at the beginning of the observed bars may ensure that also groupings of bars can be evaluated which assume that one or more bars in the first category are "zero height" bars and/or which assume that one or more bars in the last category are "zero height" bars. According to one example, the number of c-bars added to the end or at the beginning of the chart comprises N−1 c-bars, whereby N is the number of c-bars within the same category specified by the currently evaluated c-chart. In this case only the last bar of the first category or only the first bar of the last category may be visible.

The sequence of c-bars represented in FIG. 4 can be considered as an extended version of the set of o-bars. C-bars which represent o-bars are depicted as black boxes, the "filler" c-bars are represented as white boxes. They may or may not have a height but the height is irrelevant for the grouping and is not evaluated in the grouping of c-bars into categories.

In order to identify a grouping scheme that groups bars into categories and assigns them to a particular series, the image analysis logic accesses the sequence of c-bars.

The h-chart generation process depicted in FIG. 5 assumes the number of c-bars per category to be "3". Two categories CAT1, CAT2 have already been identified as valid groupings of c-bars, i.e., as groupings that do not violate a constraint. Said groupings are saved, but as long as one or more c-bars that correspond to an o-bar have not been grouped into a respective category, the h-chart completion for a currently examined grouping is not finished.

In order to find all c-bar groupings that do not violate a constraint and that assign at least each c-bar corresponding to an o-bar to a respective category, a sliding window approach is used for identifying all valid, complete groupings and store them in the form of h-charts to memory or to a non-volatile storage medium.

FIG. 5A depicts an initial situation for identifying valid c-bar groupings based on the assumption that the number N of c-bars per category is 3. Valid c-bar groupings for the first and the second category have already been identified and all valid (i.e., non-constraint-violating) c-bar groupings for the ungrouped black c-bars shall now be identified, FIG. 5B depicts a candidate for the third category that does not violate a constraint: the first three neighboring c-bars start immediately behind category2 and include at least one c-bar mapped to a visible o-bar (bar "C"). Thus, the c-bar grouping for category 3 is maintained and stored.

FIG. 5C depicts a further candidate for the third category that does not violate a constraint: the first three neighboring c-bars start one bar behind category2 and include at least one c-bar mapped to a visible o-bar (bar "C"). Thus, the c-bar grouping for category 3 is maintained and stored.

FIG. 5D depicts a further candidate for the third category that does violate a constraint: the first three neighboring bars start two c-bars to the right of the last bar of category2 with the consequence that a "black" c-bar between categories 2 and 3 is not mapped to any category. This constitutes a constraint violation. Thus, the c-bar grouping for category 3 is discarded without storing and the image analysis logic does not shift the window for identifying valid c-bar groupings for category 3 any further to the right.

Figure 6:
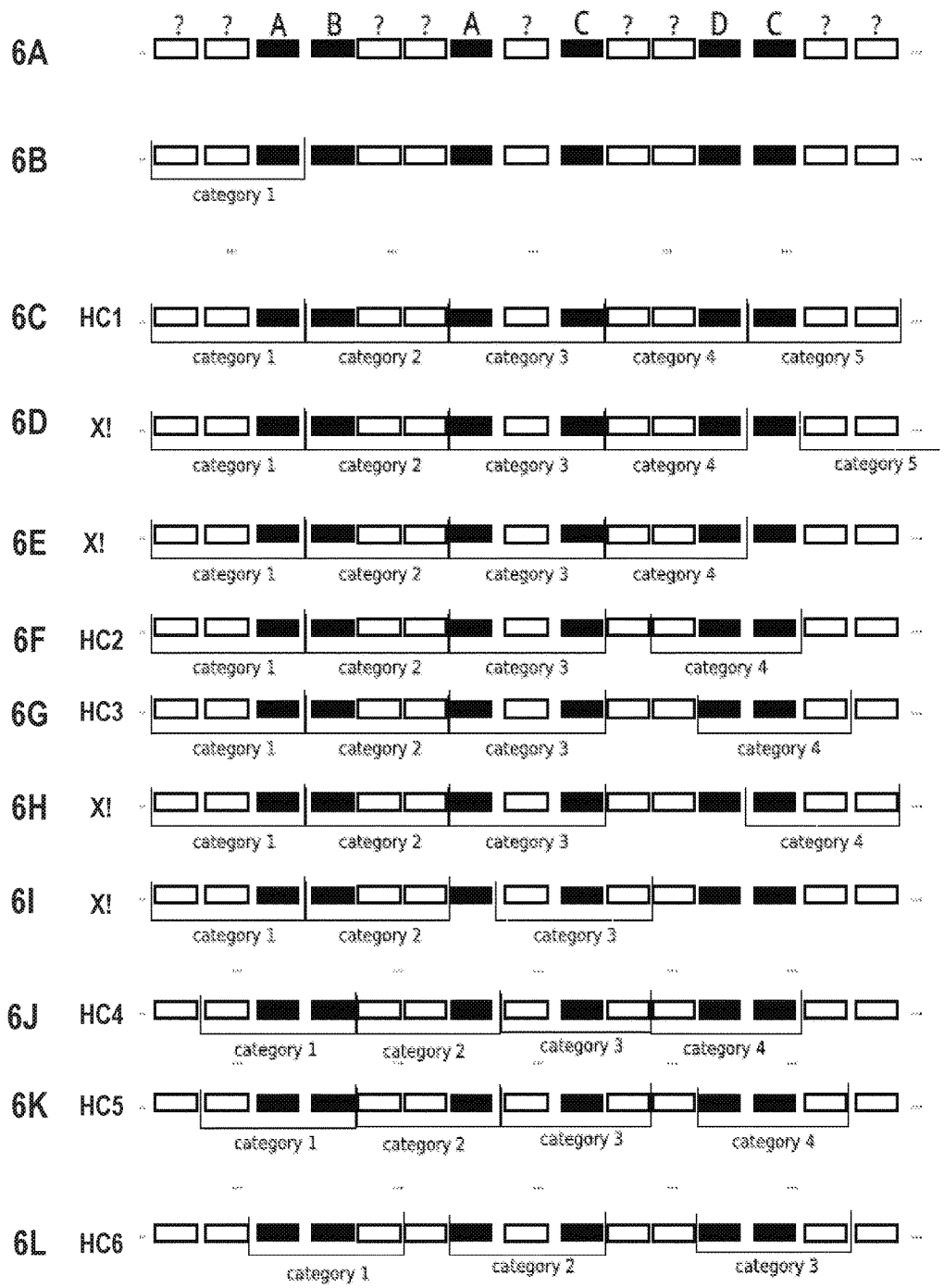
FIG. 6A-L depict the generation of hypothesis charts.

FIG. 6 depicts the generation of multiple h-charts by applying a sliding window approach over a series of o-bars of a chart in a digital image. In the depicted example, h-charts which comprise N=3 bars per category are created.

In a first step depicted in FIG. 6A, a series of 15 c-bars is created by representing each o-bar as a c-bar and by filling spaces between o-bars with as many c-bars as possible given the assumption that the width of the c-bars equals the width of the observed bars. The c-bars that correspond to o-bars are depicted in black, the "filled-in" c-bars in white. The white bars represent potential bars that may not be observed e.g. because the height of said bar was "0".

FIG. 6B depicts the first possible grouping of 3 c-bars into a first category that does not violate a constraint. However, this may not be the only possible grouping of c-bars and many black c-bars exist that have not yet been grouped into a category. Thus, the grouping of 6B is stored but no complete h-chart is generated at this stage as the grouping of the other black c-bars outside the first category has not been completed yet.

FIG. 6C depicts the first identified grouping wherein all black c-bars (c-bars mapped to and representing an o-bar) have been assigned to a category without violating a constraint. An h-chart HC1 is generated for the grouping depicted in FIG. 6C.

FIG. 6D depicts a grouped sequence of c-bars generated by shifting the last group of c-bars by one for testing if said group violates a constraint. As the black c-bar between categories 4 and 5 is not assigned to any category, a constraint is violated and the grouping of the c-bars into category 5 as depicted in 6D is discarded. The shifting of the grouping for category 5 is aborted. Rather, the grouping of category 4 is modified (see FIG. 6E), No h-chart is created based on the grouping depicted in 6D.

FIG. 6E does not represent a valid grouping option as the black c-bar that follows the category 4 is not assigned to a category. No h-chart is created based on the grouping depicted in 6E.

FIG. 6F depicts a second grouping wherein all black c-bars (c-bars mapped to and representing an o-bar) have been assigned to a category without violating a constraint. A second h-chart HC2 is generated for the grouping depicted in FIG. 6F.

FIG. 6G depicts a third grouping wherein all black c-bars (c-bars mapped to and representing an o-bar) have been assigned to a category without violating a constraint. A third h-chart HC3 is generated for the grouping depicted in FIG. 6G.

FIG. 6H does not represent a valid grouping option as the black c-bar to the left side of category 4 is not assigned to a category. No h-chart is created based on the grouping depicted in 6H.

FIG. 6I does not represent a valid grouping option as the black c-bar between the second and the third category is not assigned to a category. No h-chart is created based on the grouping depicted in 6I.

FIGS. 6J-L depict three further groupings wherein all black c-bars (c-bars mapped to and representing an o-bar) have been assigned to a category without violating a constraint. Three further h-charts HC4, HC5, HC6 are generated for the grouping depicted in FIGS. 6J-6L. FIGS. 6A-6L depict examples for valid and invalid groupings, but the number of examples presented in FIG. 6 may not be exhaustive. More valid groupings and corresponding h-charts may be found which are not depicted.

For each of the valid groupings HC1-HC6, a first color for the first category position (first series), a second color for the second category position (second series) and a third color for the third category position (third series) is determined by detecting the colors of the o-bar at the respective position (1, 2 or 3) in each category, if any, determining the most frequent color and assigning said most frequent color to all h-bars in the h-chart located in the respective category position (series).

After having generated a plurality of h-charts HC1-HC6 and optionally further h-charts based on a different number N of bar charts (not shown), the one of the h-charts which is most similar to the o-bars of the chart image is determined.

Figure 7A:
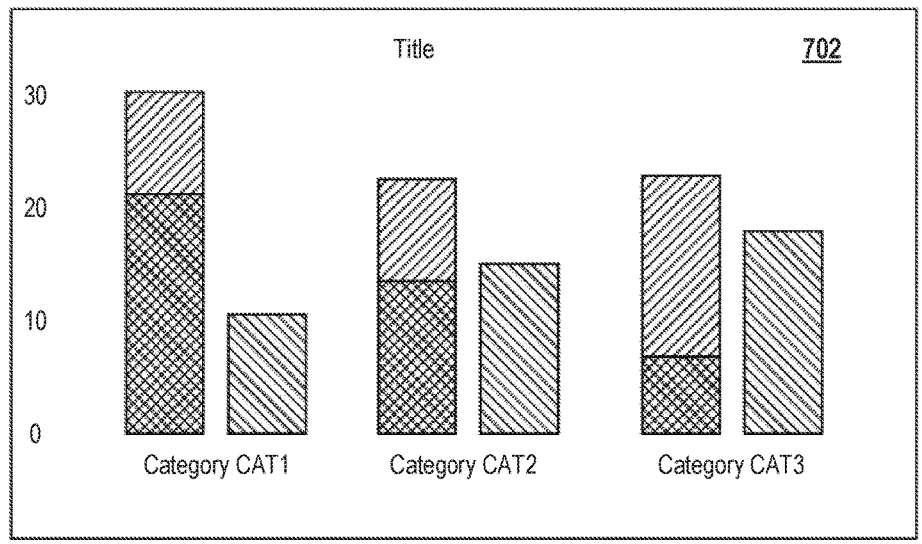
FIG. 7A-B depict background segments and bar-segments identified by a segmentation algorithm evaluating horizontal and/or vertical stripes of an image comprising the chart.

FIG. 7A depicts background segments and bar-segments of a vertical bar chart identified by a segmentation algorithm evaluating horizontal and/or vertical stripes of an image comprising a chart 702.

Figure 7B:
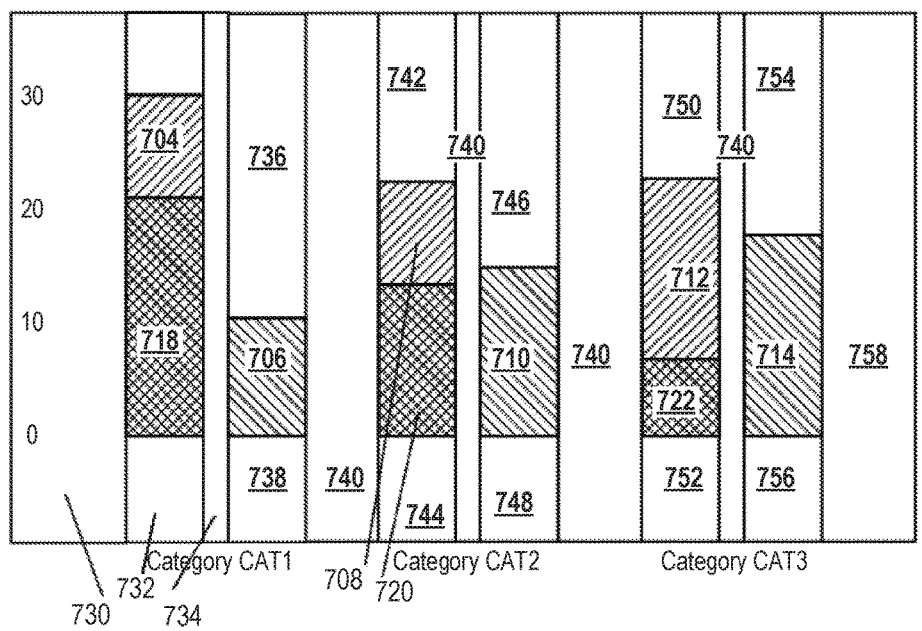

Vertical bars of bar charts are extracted from the chart in the image by segmenting the image into columns and the gaps between them as depicted in FIG. 7b. Thus, a plurality of columns is generated. Each column may consist of a single segment (e.g. the background segments 730, 758 at the left and right border of the image or the background columns 734, 740 corresponding to the space between two bars) or of a mixture of one or more bar segments 704, 718, 706, 708, 720, 710, 722, 712, 714 and one or more background segments 732, 736, 738, 744, 742, 746, 748, 752, 750, 756, 754. Thus, each vertical column comprises a set of one or more stacked (background or bar) segments. This creates a segmentation into columns of vertically aligned rectangles of same width, following the characteristics of stacked and grouped column charts. In a bar chart with unsegmented bars, each bar corresponds to a single bar segment that is typically surrounded by a background segment at the bottom and a further background segment at the top.

"Background segments" are also referred to as "border segments" 730, 732, 734, 736, 758 as background segments are segments touching the image border at at least one edge. "Bar segments" are also referred to as "inner segments" 704, 718, 706, . . . , 714 as bar segments are segments lying totally inside the image. Both may include some noise.

Any description of the vertical bar chart example depicted in FIGS. 7a and 7b likewise applies to a horizontally oriented bar chart due to the rotational symmetry between column and bar charts. Thus, the same segmentation procedure can be used for both orientations by rotating bar charts by 90 degrees if the type of the input chart (bar or column chart) is known. If the orientation of the chart (horizontal or vertical bar chart or a bar chart rotated by 180 or 270 degree in different directions) is not known, the best segmentation result for all orientations of the chart is computed and the best segmentation result of all computations is output as the final segmentation result.

The results generated by the segmentation approach can be used as the "visible" (or "observed") bars in the chart.

The segmentation can be performed according to various image segmentation approaches known in the art. In the following, with reference to FIGS. 8 and 9, a novel and particularly robust algorithm for horizontal and vertical bar charts according to embodiments of the invention will be described.

Figure 8:
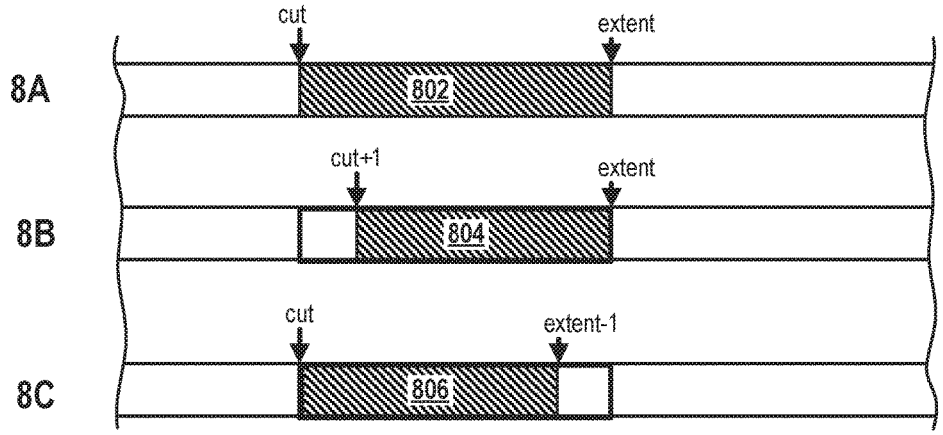
FIG. 8 depicts the probability model for the occurrence of image stripes and sub-segments used for identifying the background and bar segments.

FIG. 8 depicts the probability model for the occurrence of image segments and sub-segments used for identifying the background and bar segments.

Figure 9:
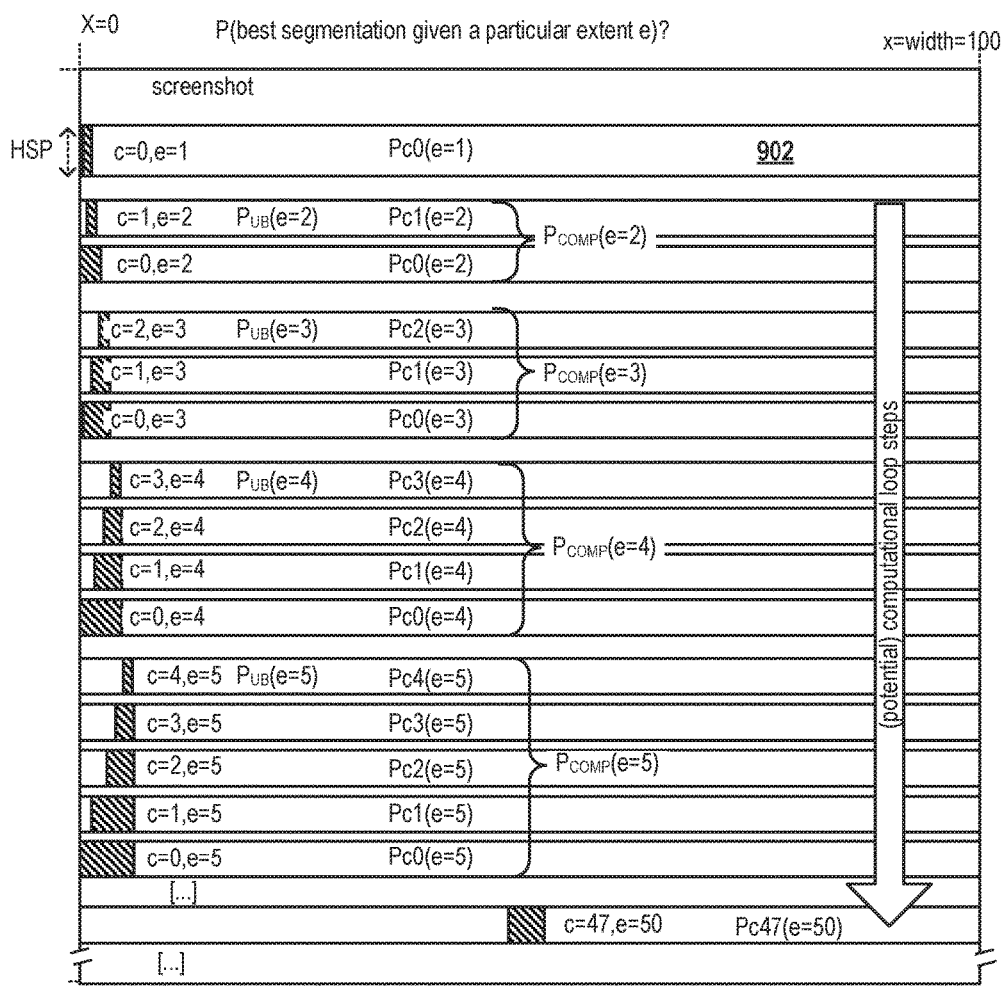
FIG. 9 is an illustration of a horizontal search space and how it is segmented in a nested loop process for different cuts c and extents e acting as left and right segment border candidates.

The segmentation approach described herein for embodiments of the invention depicted, for example, in FIG. 9, is based on a dynamic programming approach which drastically reduces computational complexity by using previously computed probabilities for the existence of a segment at a particular pixel interval within a horizontal (or vertical) pixel stripe as estimations for later computed probabilities. The estimation is based on the assumption that the existence of an interval 802 of pixels covering more than one pixel is less probable than the existence of a sub-interval 804, 806 of pixels of said interval 802. This assumption is based on principles of the probability theory according to which the probability of the existence of an entity decreases with a growing number of assumptions that need to be fulfilled so said entity can exist.

FIG. 8a shows a horizontal pixel stripe crossing the whole width of the image. It comprises a horizontal sub-segment 802 ranging from a cut to an extent. The probability for the existence of the sub-segment 802 can be modeled e.g. by a probability function that takes color and/or texture attributes and also optionally further attributes, e.g. the width of the sub-segment, as input. Thus, the occurrence probability of the sub-segment 802 may be, according to a predefined probability function, Pa.

FIG. 8b shows a sub-segment 804 of the sub-segment 802. The sub-sub-segment 804 ranges from the cut of 802+1 to the same extent as of 802. The probability for the existence of the sub-sub-segment 804 is modeled by a probability function that outputs an occurrence probability Pb of the sub-sub-segment 804 that is higher than the occurrence probability computed for the sub-segment 802. Thus, the probability of the occurrence of sub-sub-segment 804, Pb, can be considered as an upper possible boundary or as an upper possible estimate value for the probability of the occurrence of the sub-segment 802, Pa.

FIG. 8c shows a sub-segment 806 of the sub-segment 802. The sub-sub-segment 806 ranges from the same cut of 802 to the extent of 802 minus 1. The probability for the existence of the sub-sub-segment 806 is modeled by a probability function that outputs an occurrence probability Pc of the sub-sub-segment 806 that is higher than the occurrence probability computed for the sub-segment 802. Thus, the probability of the occurrence of sub-sub-segment 806, Pc, can be considered as an upper possible boundary or as an upper possible estimate value for the probability of the occurrence of the sub-segment 802, Pa.

The computation and use of occurrence probabilities for pixel sub-segments as an upper bound and estimate value for the occurrence probabilities of a larger pixel stripe (pixel segment candidate) comprising said sub-segment is described in greater detail by making reference to the example depicted in FIG. 9.

FIG. 8 illustrates the probabilities in respect to a horizontal bar pixel stripe 802 and two horizontal sub-segments, but the probability model described for the horizontal dimension likewise applies to the vertical dimension.

FIG. 9 is an illustration of a horizontal pixel stripe 902 and this stripe it is segmented in a nested loop process (corresponding to the arrow: "(potential) . . . loop steps") using different cuts c and extents a It is assumed that the chart is a vertically oriented bar chart, e.g. a chart as depicted in FIG. 7. For vertical bar charts, the segmentation may be started in horizontal direction for identifying left and right segment borders. The left and right segment borders typically correspond to the width of a horizontal bar or of an inter-bar space. The height of individual bars or bar segments is identified dynamically by a further segmentation process performed in vertical direction in an inner loop. The horizontal pixel stripe 902 in FIG. 9 represents the horizontal search space HSP for performing the first dynamic programming algorithm. After having finished the segmentation of the current pixel stripe 902 in horizontal direction (as illustrated in FIG. 9), also the segmentation in vertical direction from bottom to top of the image (not shown) is completed as the horizontal and vertical segmentation are performed in a nested manner. All horizontal stripes in Fig, 9 actually correspond to the pixel stripe 902 but are depicted for space reasons at different vertical positions.

In respect to the pixel stripe 902, the image analysis logic tries to compute the occurrence ("existence") probability of all possible segmentations for identifying that segmentation that has the highest probability of occurrence given the pixel information of the chart image. One or more probability functions are specified ("modeled") which output an occurrence probability for a segment given the segment's cut (offset), extent (offset+segment length) and some predefined or empirically determined color/texture attributes. The probability functions are modeled such that the occurrence probability of a sub-segment is always higher than the occurrence of a segment having the same features as said sub-segment and fully comprising said sub-segment (see FIG. 8). The search space of all possible segmentations is traversed in a nested looping process comprising a first outer loop iterating over all extents and a second, inner loop iterating over all cuts in a manner that previously computed segmentation probabilities for sub-segments can be re-used as an estimated upper probability value in a subsequent step for determining if the probability of the segment given the current cut and extent should be calculated at all or if the method should proceed with evaluating another cut or extent, e.g. in case the maximum possible occurrence probability is too small. This approach may drastically reduce the computational complexity and the amount of computational resources needed as previously computed results are used as estimations for later results. Thus, the exact computation of a probability value which takes into account pixel data is in many cases not necessary and whole computational branches can be skipped as the occurrence probability for a particular segment that may be maximally obtainable may be considered to be too low.

The term "best segmentation" found for a particular extent e relates to the segmentation of a pixel stripe up to the currently examined "extent". The segmentation may comprise one or more segments between pixels 0 and said extent e, whereby the probability of some segments may have been computed already in previous iterations.

In the following, the definitions of some terms and variables used for performing the segmentation are provided:

The "best segmentation" identified for a given extent e is a set {(c1, e1), (c2, e2), (cn, en)} of pairs of cuts and extents whose overall probability has been identified as the highest of all possible sets of pairs of cuts c and extents e. For example, a first set of cut and extent pairs {(0, 5), (5, 20), (20, 67), . . . (92, 100)} corresponding to sub-segment candidates {[0-5], [5-20], [20-67], [92-100]} may have a higher probability as a second set of cuts and extents {(0, 10), (10, 33), . . . (78, 100)} corresponding to sub-segments {[0-10], [10-33], . . . , [78-100]} and have a higher probability than any other sets of segment candidates for a given e. In this case, the "first segmentation set" is the "best segmentation" identified for extent e.

The variable Pcomp(e) represents the probability of the "best segmentation" identified for the extent e, whereby all possible cuts c=e−1, c=0_have been evaluated and whereby the "best segmentation" may comprise one or more sub-segments. As mentioned above, the "best segmentation" may comprise one or more sub-segments. For example, for e=10, Pcomp(10) represents the probability of the best segmentation identified within a range between pixel columns 1 to 10, whereby said best segmentation may correspond to the sub-segments [0-3][3-7][7-10] because another segmentation, e.g. [0-6][6-10] was identified to have a lower probability (e.g. because the color distribution of the segment models resulted in higher probability values for the sub-segments [0-3][3-7][7-10]).

The variable Pc(e) represents the probability of the best segmentation comprising a segment that starts at cut c and ends at extent e. For example, Pc2(e=3) represents the probability of the best segmentation of the first three pixel columns comprising segment [2-3]. Pc1(e=3) represents the probability of the best segmentation of the first three pixel columns comprising segment [1-3]. Pc0(e=3) represents the probability of the best segmentation of the first three pixel columns comprising segment [0-3]. Said three probabilities Pc0(e=3), Pc1(e=3) and Pc2(e=3) may be computed for extent e=3 in the inner loops of the nested segmentation algorithm described below. Pcomp(e) represents the best (i.e., most probable) one of the three probabilities Pc0(e=3), Pc1 (e=3) and Pc2(e=3).

To give a concrete example, a first Segmentation S1 computed for extent e=20 may comprise segment candidates {[0-5], [5-16], [16-20]} and have an overall probability of P1. A second Segmentation S2 computed for extent e=20 may comprise segment candidates {[0-7], [7-11], [11-16], [16-20]} and have an overall probability of P2. A third Segmentation S3 computed for extent e=20 may comprise segment candidates {[0-5], [5-11], [11-17], [17-20]} and have an overall probability of P3. For computing Pc(e) for cut=16 and extent e=20, i.e., for computing P16(20), the third segmentation can be ignored as it does not comprise the segment [16-20]. So in the given example, P16(20)=max(P1, P2) provided that only the above mentioned two segmentations exist comprising segment [16-20].

According to embodiments, a nested dynamic programming routine uses Pcomp($e_{prev}$) values computed for a previously evaluated extent e having the same value as a currently examined cut c as the already precomputed P_best_leftside value: P_best_leftside=Pcomp($e_{prev}=c_{current}$).

The search for the best segmentation is iteratively performed by looping, in a first loop, over a horizontal pixel stripe by examining segmentations of sub-segments covering the first pixel (extent e=1), two pixels, three pixels, up to an extent e=width of the image, e.g. e=100, and for looping, in a second loop, from a cut c=e−1 to c=0.

In each of the inner loops, for a currently examined extent e and a currently examined cut c, computing an estimated value of Pcomp(e) according to Pcomp(e)=Pcomp(c)*P[c-e]], wherein in FIG. 9 Pcomp(c)*P[c-e] is referred to as Pc(e) and wherein P[c-e] are estimate values, being optionally computed exactly. Then, the value Pcomp(e=image-width) and Pcomp(e=image-height) is computed in a nested manner.

Thereby, for each new c and a corresponding new combination of c and e, a new segmentation candidate is evaluated. The evaluation comprises using for the first c pixel columns, i.e. for pixels ranging from first pixel column to column c, the best already computed segmentation probability P_best_leftside=Pcomp(c). This means that the variable P_best_leftside is set to the already computed Pcomp(c) value. Then, computing the "overall" probability Pc(e), e.g. Pc1(e=2), of a segmentation of the first e pixel columns by computing the product P_best_leftside*P[c-e]=Pcomp(c)*P[c-e], with P[c-e] denoting the probability of the segment [c-e] being a true segment.

Extent e=1

For example, at first the probability for a segment ranging from c=0 to e=1 ("[0-1]"), P[0-1] is computed. When segmenting a horizontal pixel stripe from left to right as shown in FIG. 9, the cut c is a left segment border candidate and the extent is a right segment border candidate. When segmenting a vertical pixel stripe from the bottom to the top of an image (not shown), the cut c is a bottom segment border candidate and the extent is a top segment border candidate.

For e=1, there exists only one segment candidate [0-1]. The corresponding segmentation probability Pc0(e=1) is computed exactly and represents the probability that the segment [0-1] is a true segment in the chart. Thus, for e=1, Pc0(e=1)=Pcomp(e=1) , i.e., the best segmentation of the first pixel column.

The algorithm may be initialized by setting Pcomp(e=0) to be "1".

Extent e=2

For e=2, there exist two segmentation candidates:

for c=1 and e=2; the segment candidate is [1-2]. The probability P[1-2] of said segment candidate cannot be estimated based on sub-segment probabilities as the segment candidate has a width of only one pixel. The probability of the corresponding left side segmentation covering the first c pixels, i.e, ranging from 0 to c=1, was calculated before in the step extent e=1 as P_best_leftside=Pcomp(c=1), the overall probability of the segmentation candidate for the first two pixel columns, including the segment [1-2], being calculated as Pc1(e=2)=Pcomp(c=1)*P[1-2] and used as a first value for Pcomp(e=2), i.e. the highest probability for the segmentation of the first two pixel columns;

for c=0 and e=2, the segment candidate is [0-2]. The upper possible probability boundary NSegm of said segment candidate can be estimated based on the probabilities of the left sub-segment [0-1] computed already previously for e=1 and of the right sub-segment [1-2] computed already previously for e=2 and c=1. The estimation is based on the segment models being defined such that the probability of a segment cannot be larger than the probability of any of its sub-segments. Thus, the upper possible probability boundary P_UB_NSegm of segment candidate [0-2] can be estimated to be the minimum of the already computed probabilities of the left [0-1] and right [1-2] sub-segments.

The estimation of the total probability of the corresponding segmentation including the segment [0-2] is computed as Pc0(e=2)=Pcomp(0)*P_UB_NSegm.

If said total probability is not smaller than Pcomp(e=2), P[0-2] is computed exactly.

If Pcomp(0)*P[0-2] is not smaller than Pcomp(e=2), the variable Pcomp(e=2) is computed according to: Pcomp(e=2)=Pcomp(0)*P[0-2].

Thereby, the value for Pcomp(e=2) is updated with the new, exactly computed value.

Pcomp(e=2) is the probability of the best segmentation of the first e=2 pixel columns.

In a set of next steps, the probability for a segment between c=0 and e=3 is computed as well as the probability of each of its potential sub-segments [1-3], [2-3] having the same extent e.

Extent e=3

For e=3, multiple segmentation candidates corresponding to c=0, c=1 or c=2 are evaluated. The following probability values are computed:

for c=2 and e=3, the segment candidate is [2-3]. The probability of said segment candidate cannot be estimated based on sub-segment probabilities as the segment candidate has a width of only one pixel. The corresponding leftside segmentation probability P_best_leftside was already computed as Pcomp(c=2); The product Pc2(e=3)=Pcomp(2)*P[2-3] is computed as described above for estimating and optionally exactly computing the probability of segment candidate [2-3] in order to get a first value for Pcomp(e=3), being the probability of the best segmentation of the first three pixel columns.

for c=1 and e=3, the segment candidate is [1-3]. The product Pc1(e=3) Pcomp(1)*P[1-3] is computed as described above for estimating and optionally exactly computing the probability of segment candidate [1-3] and optionally updating Pcomp(e=3).

for c=0 and e=3, the segment candidate is [0-3]. The product Pc0(e=3)=Pcomp(0)*P[0-3] is computed as described above for estimating and optionally exactly computing the probability of segment candidate [0-3] and optionally updating Pcomp(3).

Pcomp(e=3) is the probability of the best segmentation of the first e=3 pixel columns.

For each of the steps a)-c), the probability P[c-e] that segment candidate [c-e] is a true segment is estimated by using a probability value of a previously computed sub-segments according to: P_UB_right32 P[c+1, e] and P_UB_left=P[c, e−1], whereby P_UB_right and P_UB_left respectively act (e.g. by determining the minimum of the two values) as an upper possible probability boundary P_UB_NSegm of the segment candidate [c-e]. If the probability of Pc(e)=Pcomp(c)*P[c-e] is predicted, based on said estimate, not to be higher than the already computed segmentations for e=current extent (e.g. "3", the best hitherto found segmentation probability being stored in the variable Pcomp(e=3)), then the exact probability of P[c-e] will not be computed. The exact computation of segment probabilities comprises applying the segment models Mi on the pixel properties of the pixels in the current segment candidates, in particular color and texture properties. The exact probability value may be stored in the variable P_UB_NSegm, replacing the previously calculated estimation.

These steps are repeated for all extents e until the best segmentation for the whole pixel stripe (extent=100) was identified. Segment borders are identified as specified by the probability function that provides the highest probability of occurrence of the actually observed bars in the chart. Thus, while iterating through the first and second loop as described above, already segmentation probabilities of the already calculated, most probable segmentation can be used as an upper bound for later segments' probabilities, as the probability of a region is always greater than the probability of a region it totally lies in (see FIG. 8). These upper bounds are used as an estimation to avoid as many exact, computational expensive calculations of probabilities as possible. Thus, the exact probability of a segmentation that may use e.g. the color or texture information of the pixel of the pixel stripe 902 as input are avoided if a corresponding segmentation cannot be better by estimation than the best alternative segmentation found so far.

According to embodiments, the segmentation can be performed in the horizontal and vertical dimension of the chart image. For example, the joint search in both dimensions can be implemented as cascading one-dimensional searches. Preferentially, the search is started in vertical dimension if the chart is a horizontal bar chart and is started in horizontal dimension if the chart is a vertical bar chart.

According to some embodiments, the segmentation algorithm for identifying the best segmentation for a given pixel stripe is computed as follows: at first, a plurality of probability functions for chart segments are defined. Each function corresponds to a model describing some of the size, color and/or texture of bar and background segments in a chart. For each model Mi a probability distribution P is given, such that for any rectangular image/screenshot|the probability P(I|Mi) that a model Mi generates I is given, whereby the segmentation probabilities output by the probability functions of the models follow the principle explained in FIG. 8. These models and probability functions can be predefined and may be used for all input images. Alternatively, they may be created individually for each input image from some image characteristics, e.g. by determining the 10 most frequently observed colors of the pixels in the image and assigning the color information to the models and their probability functions. It is also possible that the models and probability functions comprise predefined models and probability functions in addition to functions and models which were generated, adapted or trained after the image was generated, e.g. by including color information of the chart contained in the image in the models.

Then, these models describing image segmentations and their respective probability functions which compute the probability of a segment generated according to said model are used in an iterative process for finding the optimal segmentation consisting of a set of bar segments and a set of background segments that has the highest overall probability.

According to embodiments, the searching for the optimal segmentation in a horizontal search space along the horizontal pixel stripe comprises identifying all positions within the horizontal stripe 902 where a segment border exists.

In a first loop, for each extent e being a position in the horizontal stripe 902 from e=1 to e=width of the horizontal stripe, execute a second loop over one or more cuts a for each cut c being a position in the horizontal stripe from c=e−1 to c=0 of the horizontal stripe, execute a set of processing steps described below.

In the following, an example computation will be described for a current cut c=47 and a current extent e=50:

a. read a P_UB_left value from a main memory or a non-volatile storage device. The P_UB_left value is a probability value that represents an upper possible bound of the probability that a sub-segment ranging from c to e−1 (here: [47-49] represents a true segment of the image. The P_UB_left can be read very quickly and does not have to be computed (except in case e=1, where P_UB_left is set to '1') as this value has been computed already in the previous iteration through the first loop for the extent e_prev=e−1 (here: 49) and for all possible cuts c_prev from c_prev=e−2 (here: 48) to c_prev=0:

b. read a P_UB_right value from the main memory or from the non-volatile storage device. The P_UB_right value is a probability value that represents an upper possible bound of the probability that a sub-segment ranging from c+1 to e (here: [48-50]) represents a true segment of the image. P_UB_right is an estimate value having been computed already in the previous iteration through the second loop for the current extent e and for the cut c_prev=c+1=48; For example, as an estimate value for [48-50] the probability value having been computed for [49-50] can be used as [49-50] is a sub-interval of [48-50] and thus represents an upper possible probability for the occurrence of a segment [48-50]. The probability for the value [49-50] may have been computed exactly using the probability functions and the pixel information contained in the pixel stripe 902. In the first iteration of the second loop there does not exist a previous value for the cut c_prev=c+1. In this case, the probability value "1" is used as the P_UB_right value.

c. compute P_UB_NSegm as the minimum of P_UB_left and P_UB_right, i.e. as the minimum of P([47-49]) and P([48-50]); in case a segment exists in the interval of 47-50, it comprises both the pixel intervals [47-49] and [48-50] and has a probability of P[47-50] that is smaller than each of the two probability values P([47-49]) and P([48-50]); thus, P_UB_NSegm represents an upper possible probability that the pixel sub-segment between c and e represents a true segmentation of the image;

d. determine if the product (or the sum for logarithmic probabilities) of he P_UB_NSegm and P_best_leftside is not smaller than Pcomp(e), wherein P_best_leftside is the probability of the most probable segmentation of the horizontal pixel stripe from 0 to c (here: [0-47]) obtained from previous iterations in the first and second loop, and wherein Pcomp(e) is the probability of the best already found segmentation of the image sub-segment ranging from 0 to e (here: from 0-50).

e. only in case said product is not smaller than Pcomp(e) (and thus, only if a new segmentation is not less probable than the best already found segmentation):

f. recompute P_UB_NSegm exactly, the exact, recomputed P_UB_NSegm representing the exact probability that the pixel sub-segment between c and e represents a true segment of the image, the recomputation comprising comparing results of probability functions assigned to a plurality of segment models under the hypothesis that a true segment exists between c and e with pixel data of the horizontal pixel stripe of the image;

g. determine if the product of the recomputed P_UB_NSegm and P_best_leftside is not smaller than Pcomp(e);

h. selectively if said product is not smaller than Pcomp(e), store said sum as Pcomp(e) to be used in later iterations of the first and second loop as Pbestleftside; and i. update a result list of segments by adding an identified horizontal segment that is defined by the segment borders c and a In the above mentioned example, a current cut c may be 47 and a current extent e may be 50 as specified above. The computer system performing the segmentation algorithm tries to compute the probability of the best (most probable) segmentation for a sub-image ranging from the first pixel to e=50 and the corresponding segment border. This probability is referred herein as Pcomp(e=50).

To compute Pcomp(e=50) for the current cut c=47, the probability of the best segmentation for a stripe [0-47] (P_best_leftside) is determined to be the best segmentation of the first pixel column to e=47: P_best_leftside=Pcomp(e=47).

Moreover, the probability P_UB_NSegm of a new segment [47-50] (having a width of 3 px) is estimated according to: P_UB_NSegm=minimum of P_UB_left and P_UB_right i.e. as the minimum of P([47-49]) and P([48-50]) respectively having a width of 2 px and having been computed already in previous iterations. They are used as upper probability boundaries as the models are configured to return higher probabilities for sub-segments than for the super-segments (see FIG. 8).

Thus, an estimated total probability for the current segmentation given a current e, Pcomp (e=50), is the product (or the sum for logarithmic probabilities) of the P_UB_NSegm and P_best_leftside=Pcomp(e=47). Only in case this value is not smaller than Pcomp(e=50) computed previously for other cuts c_prev, P_NSegm is computed exactly by using color and texture pixel information of the image as input.

The exact computation of P_UB_NSegm returns the probability that the pixel sub-segment between c and e represents a true segment of the image, The exact computation is performed only in case special conditions are fulfilled. In many cases, the exact computation of P_UB_NSegm will be skipped. Thus, although the search space of the segmentation result is very large, an exact computation of the probabilities for a particular segment is performed only rarely, According to preferred embodiments, the Pcomp(e=47) value is computed once and then reused in later iterations. Thus, a dynamic programming segmentation approach is provided which reduces CPU consumption.

At the end of this approach, Pcomp(e=image-width) is computed, i.e., the most probable segmentation of the whole image comprising the chart.

The invention claimed is:

1. A computer-implemented image analysis method for automatically extracting data from a bar chart, the method comprising:

receiving a digital image of a bar chart, the digital image comprising a plurality of observable bars (o-bars), each o-bar being a set of pixels of the digital image representing a bar of the bar chart;

providing a plurality of hypothesis charts, each hypothesis chart being a data object that specifies a sequence of hypothetical bars (h-bars) and a particular way of grouping the h-bars into categories, and that comprises an injective mapping from the o-bars to the h-bars such that each o-bar has assigned thereto exactly one of the h-bars of said hypothesis chart, wherein each hypothesis chart comprises an assignment of at least one of an expected, series-specific color and an expected, series-specific texture to each respective h-bar in dependency on a position of the respective h-bars in a respective category;

comparing a position and at least one of a color and a texture of the h-bars of each of the plurality of hypothesis charts with a position and at least one of a color and a texture of their respectively mapped o-bars, and identifying a hypothesis chart among the plurality of hypothesis charts that is most similar to the bar chart based on the comparing;

applying the grouping of the h-bars into categories as specified in the identified most similar hypothesis chart to the o-bars, such that each o-bar gets assigned thereto a data series and a category of an h-bar of the identified most similar hypothesis chart respectively mapped to said o-bar;

returning the data series and the category respectively assigned to each of the o-bars by the identified most similar hypothesis chart, including automatically extracting numerical data represented by the o-bars of the bar chart, the extracted numerical data comprising, for each o-bar, a data value represented by a height of said o-bar, and representing the extracted numerical data in a tabular data structure; and outputting the tabular data structure.

2. The computer-implemented method of claim 1, wherein each of the columns of said tabular data structure representing one of the data series and comprising numerical data represented by o-bars respectively assigned to said one of the data series, and each of the rows of said tabular data structure representing one of the categories and comprising numerical data represented by o-bars respectively assigned to said one of the categories, or vice versa; and the outputting of the tabular data structure includes at least one of exporting the extracted numerical data into a first application program configured to automatically generate charts from tabular data structures, and generating, by the first application program, a new chart from the extracted numerical data, and exporting the extracted numerical data into a second application program configured to automatically analyze numerical data contained in tabular data structures, and outputting, by the second application program, a numerical result generated based on analyzing the extracted numerical data.

3. The method of claim 2, the method comprising:

for each o-bar,
identifying a label positioned in spatial proximity to said o-bar;
extracting a numerical value specified in said label by applying an optical character recognition (OCR) algorithm;
using the assignment of the o-bars to a data series and to a category for assigning, to the extracted numerical value, the data series and the category to which its corresponding o-bar was respectively assigned; and
filling one of the cells of the tabular data structure with the extracted numerical value, whereby the numerical value having assigned thereto a particular data series and a particular category fills the one of the cells in the tabular data structure whose corresponding row and column represent said particular data series and said particular category.

4. The method of claim 1, the identification of the most similar hypothesis chart comprising, for each hypothesis chart:

determining an insertion defect for each h-bar of the hypothesis chart that cannot be aligned, according to the infective mapping from o-bars to h-bars specified in the hypothesis chart, to one of the o-bars of the bar chart; and determining a substitution defect for each h-bar of the hypothesis chart that has a different color or a different texture than the one of the o-bars to which said h-bar is aligned; and accumulating a totality of insertion defects and substitution defects, and computing a similarity score based on the accumulating, whereby the higher the number of insertion defects and substitution defects, the lower the degree of similarity between the hypothesis chart and the bar chart.

5. The method of claim 1, the providing of the plurality of hypothesis charts comprising:

identifying a width of the o-bars;
generating a sequence of candidate bars (c-bars) by representing each o-bar identified in the bar chart as a c-bar and by inserting as many c-bars having the identified width in the spaces between adjacent c-bars of said sequence of c-bars as possible;
tentatively grouping the c-bars into data series and categories, and identifying the totality of groupings which respectively group at least all c-bars representing an o-bar into one or more categories of h-bars without violating one or more predefined constraints, whereby each grouping that does not violate a constraint is used as a respective hypothesis chart that groups h-bars into categories and data series; and
providing the identified totality of hypothesis charts not violating a constraint.

6. The method of claim 5, the identification of all hypothesis charts which group the c-bars into one or more categories respectively comprising N h-bars without violating one or more predefined constraints comprising:

a) grouping an initial set of N c-bars of the sequence of c-bars into a first candidate for the first category of the bar chart without violating a constraint and starting creating a first hypothesis chart having stored the grouping of c-bars of the first category;

b) grouping a subsequent set of N c-bars of the sequence of c-bars into a first candidate for a subsequent category of the bar chart, the subsequent set of bars consisting of the N c-bars immediately following the position of the last bar of the category into which said N c-bars were grouped in the previous grouping step;

c) checking if a predefined constraint is violated upon grouping the subsequent set of N c-bars and if a termination condition is fulfilled;

d) if no constraint is violated, storing the grouping generated in step b) as a subsequent category to the hypothesis chart whose creation started in a) and repeating step b) on a set of N c-bars to be grouped that is shifted by N c-bars;

e) if no constraint is violated and all c-bars representing an o-bar have been grouped into a category, returning the hypothesis chart whose creation started in a);

f) if one or more constraints are violated, repeating step b) on a set of N c-bars to be grouped that is shifted by one without storing the grouping generated in step b) as a subsequent category to the hypothesis chart whose creation started in a).

7. The method of claim 5, the one or more predefined constraints being selected from a group comprising:

a) in case a chart depicts multiple data series, each h-bar of a category must belong to a different data series;

b) in case a chart depicts multiple data series, the order of the data series, the h-bars of a category belong to, is identical for all categories of the bar chart;

c) at least one h-bar in each category in the bar chart can be mapped to an o-bar;

d) there must be fewer h-bars per category than the total number of o-bars in the bar chart; and e) within the sequence of h-bars, the space between adjacent h-bars of different categories is never smaller than the space between adjacent h-bars within the same category.

8. The method of claim 5, the method comprising identifying the plurality of o-bars in the bar chart by applying a segmentation method to the digital image of the bar chart.

9. The method of claim 8, the segmentation method comprising:

providing a plurality of bar segment models and background segment models, each bar segment model being descriptive of pixel properties of a bar region of a particular type, each bar segment model having assigned a probability function that outputs, for any input pixel region s, a probability P(I(s)|Mi) that indicates for said pixel region the probability that said model Mi generates the pixel properties of said chart image pixel region I(s);

each background segment model being descriptive of pixel properties of a chart background region s, each background segment model having assigned a probability function that outputs, for any input pixel region s, a probability P(I(s)|Mi) that indicates for said pixel region the probability that said model Mi generates the pixel properties of said chart image pixel region I(s);

the probability functions of each bar segment model and each background segment model fulfilling the condition that a first probability that is output by said model for generating a particular set of pixel properties for a first pixel matrix is higher than a second probability that is output by said model for generating said particular set of pixel properties for a second pixel matrix being a proper superset of the first pixel matrix.

10. The method of claim 8, the segmentation method comprising:

searching a horizontal search space ranging from pixel position x=0 to x=width of the image or sub-image, thereby using a first dynamic programming algorithm for identifying the most probable horizontal segmentation of the horizontal search space, the most probable horizontal segmentation being indicative of the most probable left and right segment borders of any segment identified in the horizontal search space, said first dynamic programming algorithm computing a probability that a currently examined segment candidate between a cut $c_{left}$ acting as candidate left segment border and an extent $e_{right}$ acting as candidate right segment border represents a true segment of the image, thereby using previously computed probabilities for one or more sub-segments contained within said segment candidate for reducing computations while searching the horizontal search space.

11. The method of claim 10, the first and the second dynamic programming algorithm being executed in a nested manner by a segmentation procedure, wherein the bar chart is a vertical bar chart;

the first dynamic programming algorithm is performed in an outer loop;

the second dynamic programming algorithm is performed in an inner loop;

the segmentation procedure using the probability of the least probable sub-segment for estimating the maximum possible probability for said segment candidate to be a real segment of the bar chart, the sub-segment totally lying inside the segment candidate, the sub-segment being defined by bottom $C_{bottom\_prev}$ and top $e_{top\_prev}$ segment borders and by left $c_{left\_prev}$ and right $e_{left\_prev}$ segment borders, the segment candidate being defined by left and right segment borders $c_{left}$, $e_{left}$ and being defined by bottom and top segment borders $c_{bottom}$, $e_{top}$, the probability of the sub-segment having been computed in previous iterations of the inner and outer loop.

12. The method of claim 10, the searching of the horizontal search space by the first dynamic programming algorithm comprising identifying the positions within the horizontal search where vertically oriented extents e acting as right segment borders and vertically oriented cuts c acting as left segment borders exist, the identification of said positions comprising:

in a first loop, for each extent e being a position in the horizontal search space from e=1 to e=width of the image, do:

in a second loop, for each cut c being a position in the horizontal search space from c=e−1 to c=0, do:

get P_UB_left, whereby P_UB_left is an upper possible bound of the probability that a sub-segment ranging from c to e−1 represents a true segment of the image, the P_UB_left having been computed already in the previous iteration through the first loop for the extent e_prev=e−1 and for all possible cuts c_prev from c_prev=e−2 to c_prev=0;

get P_UB_right, whereby P_UB_right is an upper possible bound of the probability that a sub-segment ranging from c+1 to e represents a true segment of the image, whereby P_UB_right is an estimate value having been computed already in the previous iteration through the second loop for the current extent e and for the cut c_prev=c+1;

compute P_UB_NSegm as the minimum of P_UB_left and P_UB_right, wherein PUB_NSegm represents an upper possible probability that the pixel sub-segment between c and e represents a true segmentation of the image;

determine if the product of the P_UB_NSegm and P_best_leftside is not smaller than Pcomp(e), wherein P_best_leftside is the probability of the most probable segmentation of the horizontal search space from 0 to c obtained from previous iterations in the first and second loop, and wherein Pcomp(e) is the probability of the best already found segmentation of the sub-segment ranging from 0 to e;

only in case said product is not smaller than Pcomp(e):
recompute P_UB_NSegm exactly, the exact, recomputed P_UB_NSegm representing the exact probability that the sub-segment between c and e represents a true segment of the image, the recomputation comprising comparing results of probability functions assigned to a plurality of segment models under the hypothesis that a true segment exists between c and e, the exact computation of P_UB_NSegm using pixel data of the horizontal search space of the image as input;

determine if the product of the recomputed P_UB_NSegm and P_best_leftside is not smaller than Pcomp(e);

selectively if said product is not smaller than Pcomp(e), store said product as Pcomp(e) for the given extent e to be used as P_best_leftside in later iterations of the first and second loop; and updating a result list of vertically oriented segments borders by adding the identified left and right segment borders c and e.

13. The method of claim 8, the segmentation method comprising:
searching a vertical search space ranging from pixel position y=0 to y=height of the image or sub-image, thereby using a second dynamic programming algorithm for identifying the most probable vertical segmentation of the vertical search space, the most probable vertical segmentation being indicative of the most probable bottom and top segment borders of any segment identified in the vertical search space, said second dynamic programming algorithm computing a probability that a currently examined segment candidate between a cut $c_{bottom}$ acting as a candidate bottom segment border and an extent $e_{top}$ acting as candidate top segment border represents a true segment of the image, thereby using previously computed probabilities for one or more sub-segments contained within said segment candidate for reducing computations while searching the vertical search space.

14. The method of claims 13, the first and the second dynamic programming algorithm being executed in a nested manner by a segmentation procedure, wherein
the bar chart is a horizontal bar chart;
the second dynamic programming algorithm is performed in an outer loop;
the first dynamic programming algorithm is performed in an inner loop;
the segmentation procedure using the probability of the least probable sub-segment for estimating the maximum possible probability for said segment candidate to be a real segment of the bar chart, the sub-segment totally lying inside the segment candidate, the sub-segment being defined by bottom $c_{bottom\_prev}$ and top $e_{top\_prev}$ segment borders and by left $C_{left\_prev}$ and right $e_{right\_prev}$ segment borders, the segment candidate being defined by left and right segment borders $C_{left}$, $e_{right}$ and being defined by bottom and top segment borders $c_{bottom}$, $e_{top}$, the probability of the sub-segment having been computed in previous iterations of the inner and outer loop.

15. The method of claim 13, the searching of the vertical search space by the second dynamic programming algorithm comprising identifying the positions within the vertical search where horizontally oriented extents e acting as top segment borders and horizontally oriented cuts c acting as bottom segment borders exist, the identification of said positions comprising:
in a first loop, for each extent e being a position in the vertical search space from e=1 to e=height of the image, do:
in a second loop, for each cut c being a position in the vertical search space from c=e−1 to c=0, do:
get P_UB_bottom, whereby P_UB_bottom is an upper possible bound of the probability that a sub-segment ranging from c to e−1 represents a true segment of the image, the P_UB_bottom having been computed already in the previous iteration through the first loop for the extent e_prev=e−1 and for all possible cuts c_prev from c_prev=e−2 to c_prev=0;
get P_UB_top, whereby P_UB_top is an upper possible bound of the probability that a sub-segment ranging from c+1 to e represents a true segment of the image, whereby P_UB_top is an estimate value having been computed already in the previous iteration through the second loop for the current extent e and for the cut c_prev=c+1;
compute P_UB_NSegm as the minimum of P_UB_bottom and P_UB_top, wherein P_UB_NSegm represents an upper possible probability that the pixel sub-segment between c and e represents a true segmentation of the image;
determine if the product of the P_UB_NSegm and P_best_lowerside is not smaller than Pcomp(e),
wherein P_best_lowerside is the probability of the most probable segmentation of the vertical search space from 0 to c obtained from previous iterations in the first and second loop, and
wherein Pcomp(e) is the probability of the best already found segmentation of the sub-segment ranging from 0 to e;
only in case said product is not smaller than Pcomp(e):
recompute P_UB_NSegm exactly, the exact, recomputed P_UB_NSegm representing the exact probability that the sub-segment between c and e represents a true segment of the image, the recomputation comprising comparing results of probability functions assigned to a plurality of segment models under the hypothesis that a true segment exists between c and e, the exact computation of P_UB_NSegm using pixel data of the vertical search space of the image as input;
determine if the product of the recomputed P_UB_NSegm and P_best_lowerside is not smaller than Pcomp(e);
selectively if said product is not smaller than Pcomp(e), store said product as new Pcomp(e) for the given extent e to be used as P_best_lowerside in later iterations of the first and second loop; and updating a result list of horizontally oriented segments borders by adding the identified bottom and top segment borders c and e.

16. A computer system comprising one or more processors, the one or more processors being configured for performing an image analysis for automatically extracting data from a chart, the one or more processors being configured for:
receiving a digital image of a bar chart, the digital image comprising a plurality of observable bars (o-bars), each o-bar being a set of pixels of the digital image, each set of said pixels representing a bar of the bar chart;

providing a plurality of hypothesis charts, each hypothesis chart being a data object that specifies a sequence of hypothetical bars (h-bars) and a particular way of grouping the h-bars into categories, and that comprises an infective mapping from the o-bars to the h-bars such that each o-bar has assigned thereto exactly one of the h-bars of said hypothesis chart, wherein each hypothesis chart comprises an assignment of at least one of an expected, series-specific color and an expected, series-specific texture to each respective h-bar in dependency on a position of the respective h-bars in a respective category;

comparing a position and at least one of a color and a texture of the h-bars of each of the plurality of hypothesis charts with a position and at least one of a color and a texture of their respectively mapped o-bars, and identifying a hypothesis chart among the plurality of hypothesis charts that is most similar to the bar chart based on the comparing;

applying the grouping of the h-bars into categories as specified in the identified most similar hypothesis chart to the o-bars, such that each o-bar gets assigned thereto a data series and a category of an h-bar of the identified most similar hypothesis chart respectively mapped to said o-bar;

returning the data series and the category respectively assigned to each of the o-bars by the identified most similar hypothesis chart, including automatically extracting numerical data represented by the o-bars of the bar chart, the extracted numerical data comprising, for each o-bar, a data value represented by a height of said o-bar, and representing the extracted numerical data in a tabular data structure; and outputting the tabular data structure.

17. A tangible, non-volatile storage medium comprising computer-interpretable instructions which, when executed by one or more processors, cause the one or more processors to perform an image analysis method for automatically extracting data from a chart, the image analysis method comprising:

receiving a digital image of a bar chart, the digital image comprising a plurality of observable bars (o-bars), each o-bar being a set of pixels of the digital image, each set of said pixels representing a bar of the bar chart;

providing a plurality of hypothesis charts, each hypothesis chart being a data object that specifies a sequence of hypothetical bars (h-bars) and a particular way of grouping the h-bars into categories, and that comprises an injective mapping from the o-bars to the h-bars such that each o-bar has assigned thereto exactly one of the h-bars of said hypothesis chart, wherein each hypothesis chart comprises an assignment of at least one of an expected, series-specific color and an expected, series-specific texture to each respective h-bar in dependency on a position of the respective h-bars in a respective category;

comparing a position and at least one of a color and a texture of the h-bars of each of the plurality of hypothesis charts with a position and at least one of a color and a texture of their respectively mapped o-bars, and identifying a hypothesis chart among the plurality of hypothesis charts that is most similar to the bar chart based on the comparing;

applying the grouping of the h-bars into categories as specified in the identified most similar hypothesis chart to the o-bars, such that each o-bar gets assigned thereto a data series and a category of an h-bar of the identified most similar hypothesis chart respectively mapped to said o-bar;

returning the data series and the category respectively assigned to each of the o-bars by the identified most similar hypothesis chart, including automatically extracting numerical data represented by the o-bars of the bar chart, the extracted numerical data comprising, for each o-bar, a data value represented by a height of said o-bar, and representing the extracted numerical data in a tabular data structure; and outputting the tabular data structure.

18. A computer-implemented method of segmenting an image along a horizontal direction, the method comprising:

searching a horizontal search space ranging from pixel position x=0 to x=width of the image, thereby using a first dynamic programming algorithm for identifying the most probable horizontal segmentation of the horizontally search space, the most probable horizontal segmentation being indicative of the most probable left and right segment borders of any segment identified in the horizontal search space, said first dynamic programming algorithm computing a probability that a currently examined segment candidate between a left candidate segment border cut $c_{left}$ and a right candidate segment border $e_{right}$ represents a true segment of the image, thereby using previously computed probabilities for one or more sub-segments contained within said segment candidate for reducing computations while searching the horizontal search space.

19. The method of claim 18, the searching of the horizontal search space by the first dynamic programming algorithm comprising identifying the positions within the horizontal search where vertically oriented extents e acting as right segment borders and vertically oriented cuts c acting as left segment borders exist, the identification of said positions comprising:

in a first loop, for each extent e being a position in the horizontal search space from e=1 to e=width of the image, do:

in a second loop, for each cut c being a position in the horizontal search space from c=e−1 to c=0, do:

get P_UB_left, whereby P_UB_left is an upper possible bound of the probability that a sub-segment ranging from c to e−1 represents a true segment of the image, the P_UB_left having been computed already in the previous iteration through the first loop for the extent e_prev=e−1 and for all possible cuts c_prev from c_prev=e−2 to c_prev=0;

get P_UB_right, whereby P_UB_right is an upper possible bound of the probability that a sub-segment ranging from c+1 to e represents a true segment of the image, whereby P_UB_right is an estimate value having been computed already in the previous iteration through the second loop for the current extent e and for the cut c_prev=c+1;

compute P_UB_NSegm as the minimum of P_UB_left and P_UB_right, wherein P_UB_NSegm represents an upper possible probability that the pixel sub-segment between c and e represents a true segmentation of the image;

determine if the product of the P_UB_NSegm and P_best_leftside is not smaller than Pcomp(e), wherein P_best_leftside is the probability of the most probable segmentation of the horizontal search space from 0 to c obtained from previous iterations in the first and second loop, and wherein Pcomp(e) is the probability of the best already found segmentation of the sub-segment ranging from 0 to e;

only in case said product is not smaller than Pcomp(e):
recompute P_UB_NSegm exactly, the exact, recomputed P_UB_NSegm representing the exact probability that the sub-segment between c and e represents a true segment of the image, the recomputation comprising comparing results of probability functions assigned to a plurality of segment models under the hypothesis that a true segment exists between c and e, the exact computation of P_UB_NSegm using pixel data of the horizontal search space of the image as input;

determine if the product of the recomputed P_UB_NSegm and P_best_leftside is not smaller than Pcomp(e);

selectively if said product is not smaller than Pcomp(e), store said product as Pcomp(e) for the given extent e to be used as P_best_leftside in later iterations of the first and second loop; and updating a result list of vertically oriented segments borders by adding the identified left and right segment borders c and e.

20. A computer-implemented method of segmenting an image along a vertical direction, the method comprising:

searching a vertical search space ranging from pixel position y=0 to y=height of the image, thereby using a second dynamic programming algorithm for identifying the most probable vertical segmentation of the vertical search space, the most probable vertical segmentation being indicative of the most probable bottom and top segment borders of any segment identified in the vertical search space, said second dynamic programming algorithm computing a probability that a currently examined segment candidate between a bottom candidate segment border cut $C_{bottom}$ and a top candidate segment border $e_{top}$ represents a true segment of the image, thereby using previously computed probabilities for one or more sub-segments contained within said segment candidate for reducing computations while searching the vertical search space.

21. The method of claim 20, the searching of the vertical search space by the second dynamic programming algorithm comprising identifying the positions within the vertical search where horizontally oriented extents e acting as top segment borders and horizontally oriented cuts c acting as bottom segment borders exist, the identification of said positions comprising:

in a first loop, for each extent e being a position in the vertical search space from e=1 to e=height of the image, do:

in a second loop, for each cut c being a position in the vertical search space from c=e−1 to c=0, do:

get P_UB_bottom, whereby P_UB_bottom is an upper possible bound of the probability that a sub-segment ranging from c to e−1 represents a true segment of the image, the P_UB_bottom having been computed already in the previous iteration through the first loop for the extent e_prev=e−1 and for all possible cuts c_prev from c_prev=e−2 to c_prev=0;

get P_UB_top, whereby P_UB_top is an upper possible bound of the probability that a sub-segment ranging from c+1 to e represents a true segment of the image, whereby P_UB_top is an estimate value having been computed already in the previous iteration through the second loop for the current extent e and for the cut c_prev=c+1;

compute P_UB_NSegm as the minimum of P_UB_bottom and P_UB_top, wherein P_UB_NSegm represents an upper possible probability that the pixel sub-segment between c and e represents a true segmentation of the image;

determine if the product of the P_UB_NSegm and P_best_lowerside is not smaller than Pcomp(e), wherein P_best_lowerside is the probability of the most probable segmentation of the vertical search space from 0 to c obtained from previous iterations in the first and second loop, and wherein Pcomp(e) is the probability of the best already found segmentation of the sub-segment ranging from 0 to e;

only in case said product is not smaller than Pcomp(e):
recompute P_UB_NSegm exactly, the exact, recomputed P_UB_NSegm representing the exact probability that the sub-segment between c and e represents a true segment of the image, the recomputation comprising comparing results of probability functions assigned to a plurality of segment models under the hypothesis that a true segment exists between c and e, the exact computation of P_UB_NSegm using pixel data of the vertical search space of the image as input;

determine if the product of the recomputed P_UB_NSegm and P_best_lowerside is not smaller than Pcomp(e);

selectively if said product is not smaller than Pcomp(e), store said product as new Pcomp(e) for the given extent e to be used as P_best_lowerside in later iterations of the first and second loop; and updating a result list of horizontally oriented segments borders by adding the identified bottom and top segment borders c and e.

* * * * *